Sept. 4, 1928.  H. R. BRAND  1,682,828
MECHANISM AND METHOD FOR CONTROLLING BUSINESS
Filed March 27, 1923   17 Sheets-Sheet 1

Sept. 4, 1928. 1,682,828
H. R. BRAND
MECHANISM AND METHOD FOR CONTROLLING BUSINESS
Filed March 27, 1923 17 Sheets-Sheet 2

Sept. 4, 1928.

H. R. BRAND 1,682,828

MECHANISM AND METHOD FOR CONTROLLING BUSINESS

Filed March 27, 1923 17 Sheets-Sheet 4

INVENTOR
H. R. Brand
BY John D. Morgan
ATTORNEY

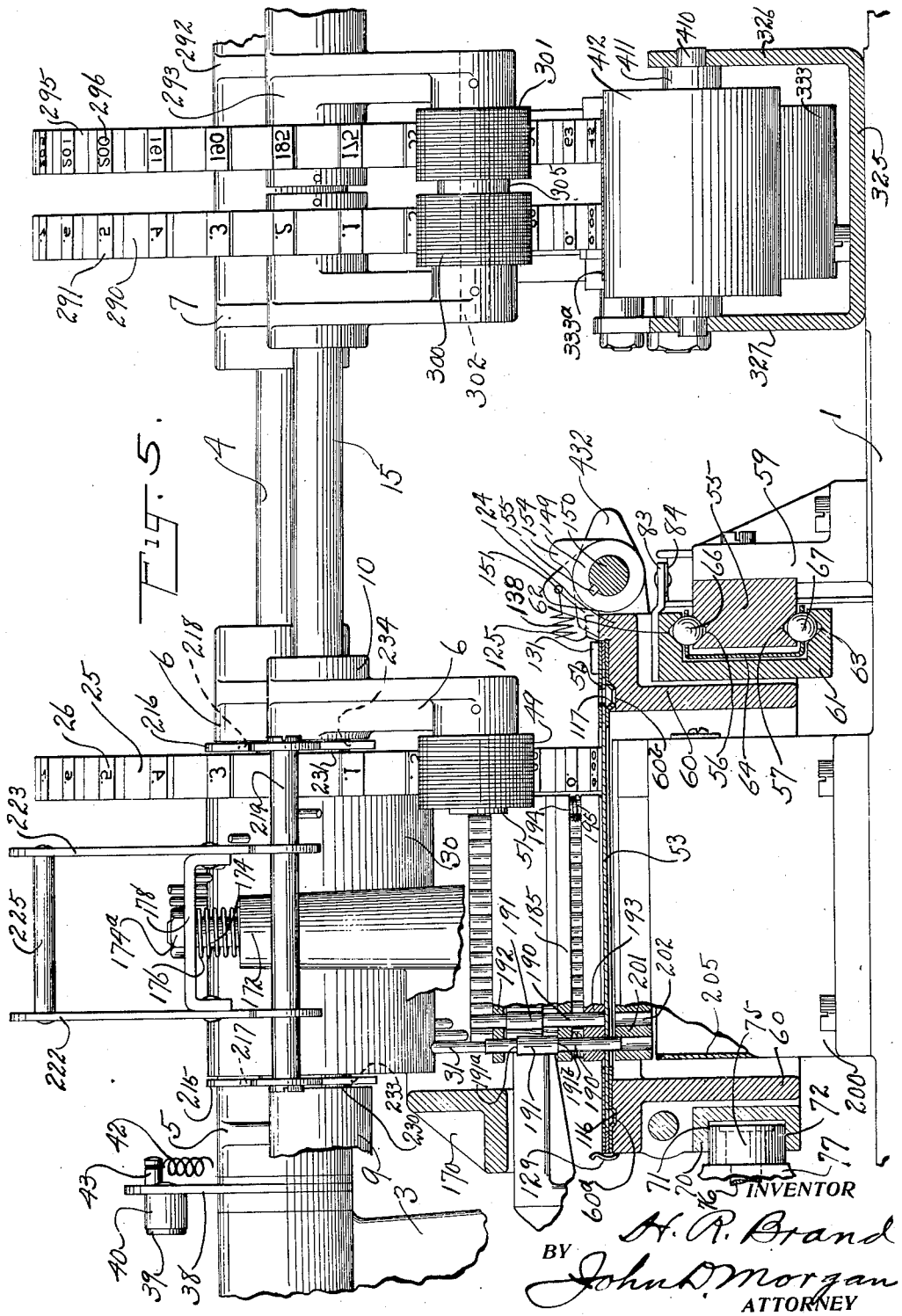

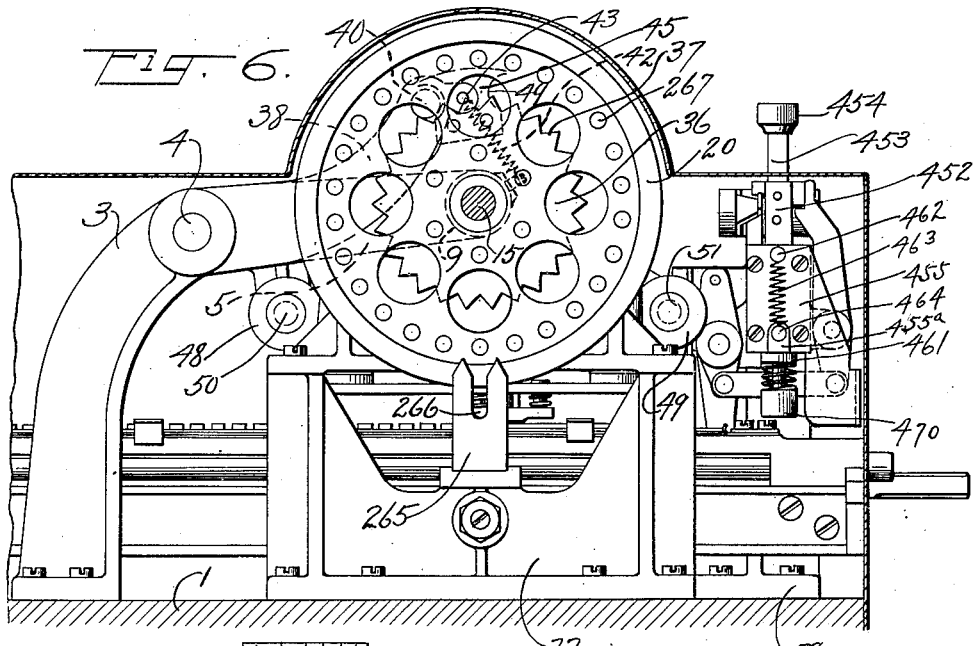
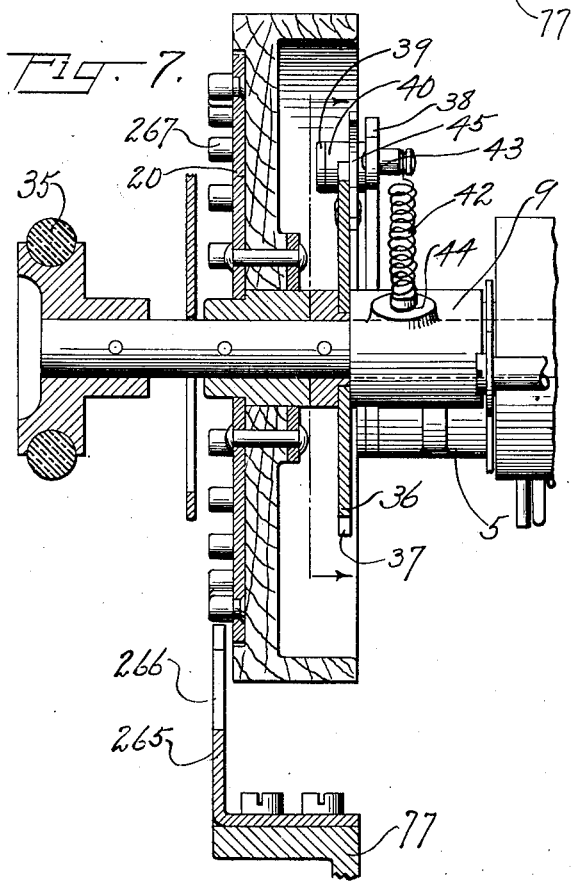
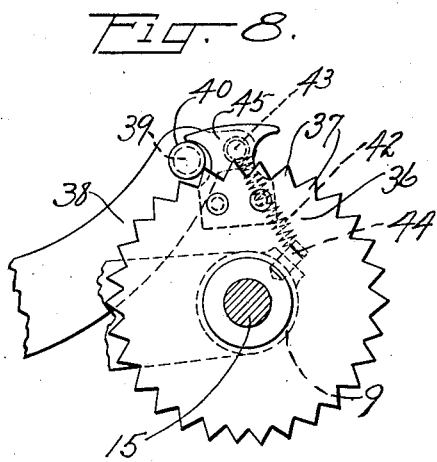

Sept. 4, 1928.  
H. R. BRAND  
1,682,828  
MECHANISM AND METHOD FOR CONTROLLING BUSINESS  
Filed March 27, 1923  17 Sheets-Sheet 7
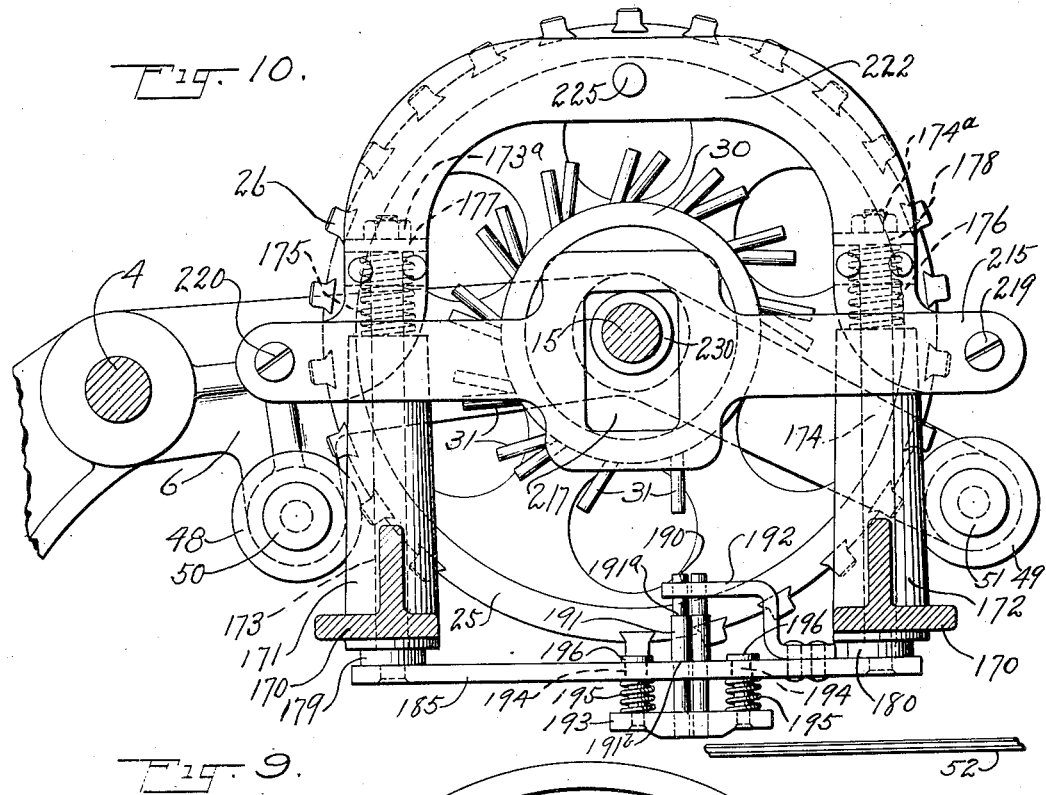

Sept. 4, 1928.  H. R. BRAND  1,682,828
MECHANISM AND METHOD FOR CONTROLLING BUSINESS
Filed March 27, 1923   17 Sheets-Sheet 8
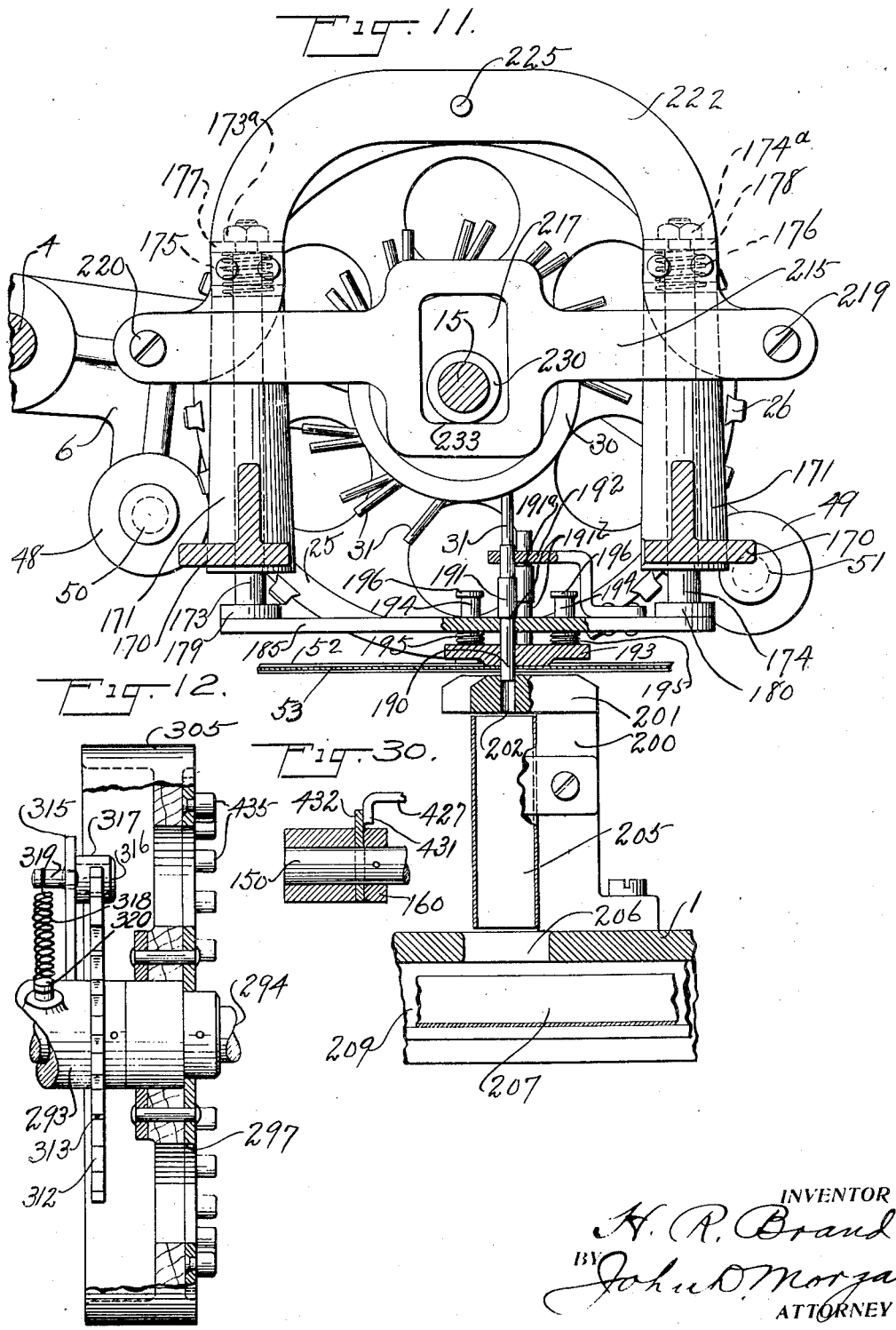

Sept. 4, 1928.  1,682,828
H. R. BRAND
MECHANISM AND METHOD FOR CONTROLLING BUSINESS
Filed March 27, 1923   17 Sheets-Sheet 9
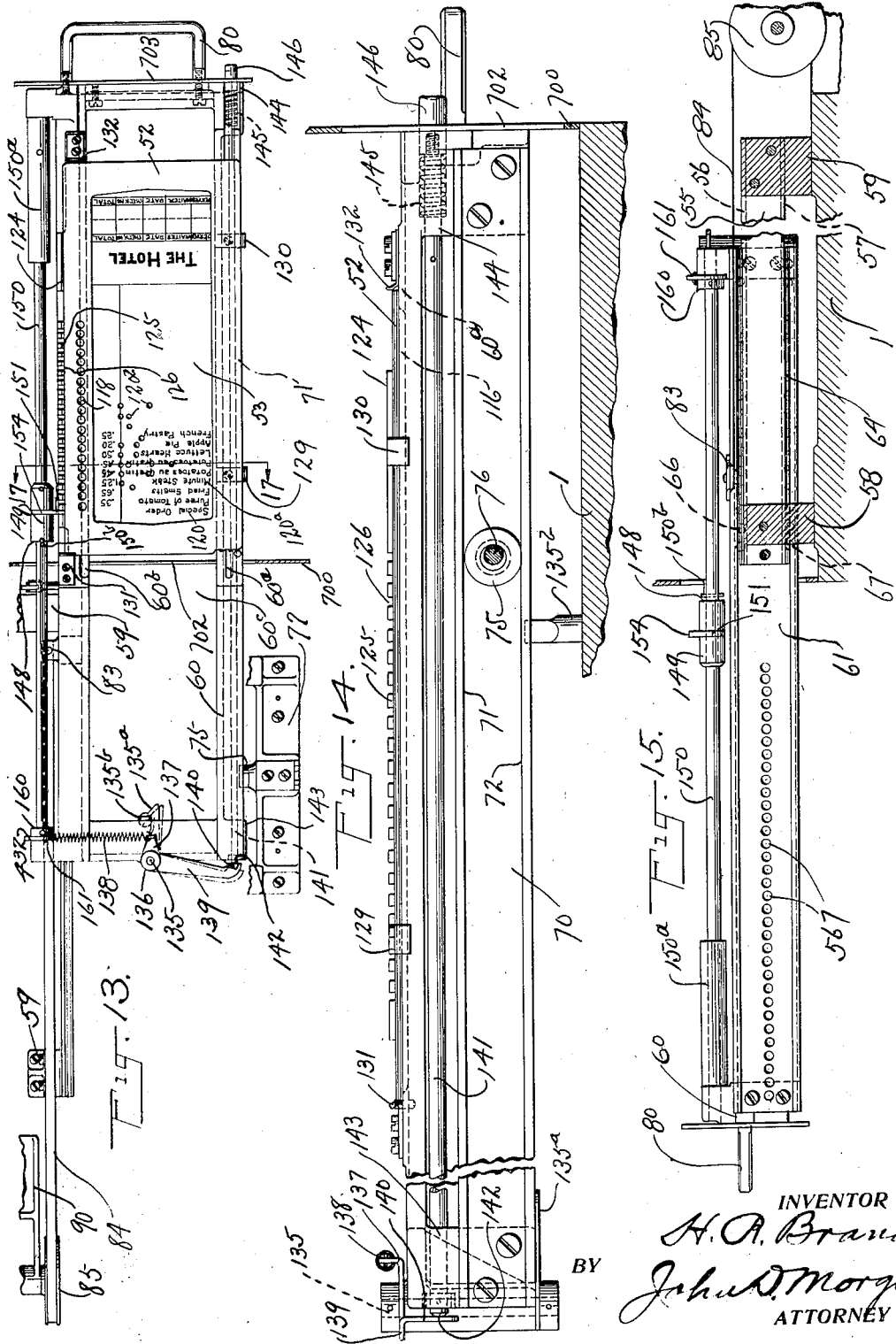
INVENTOR
H. R. Brand
BY John D. Morgan
ATTORNEY

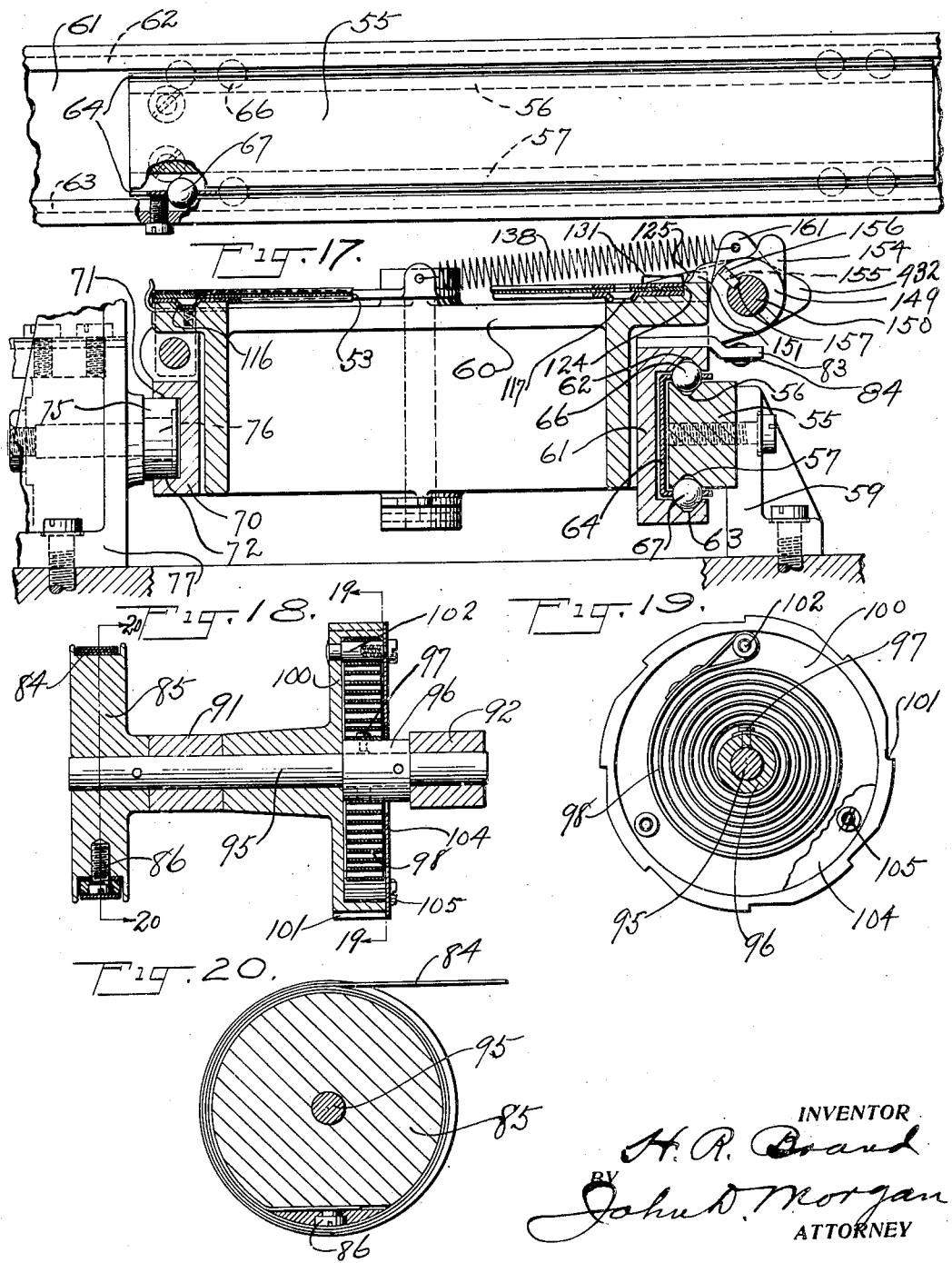

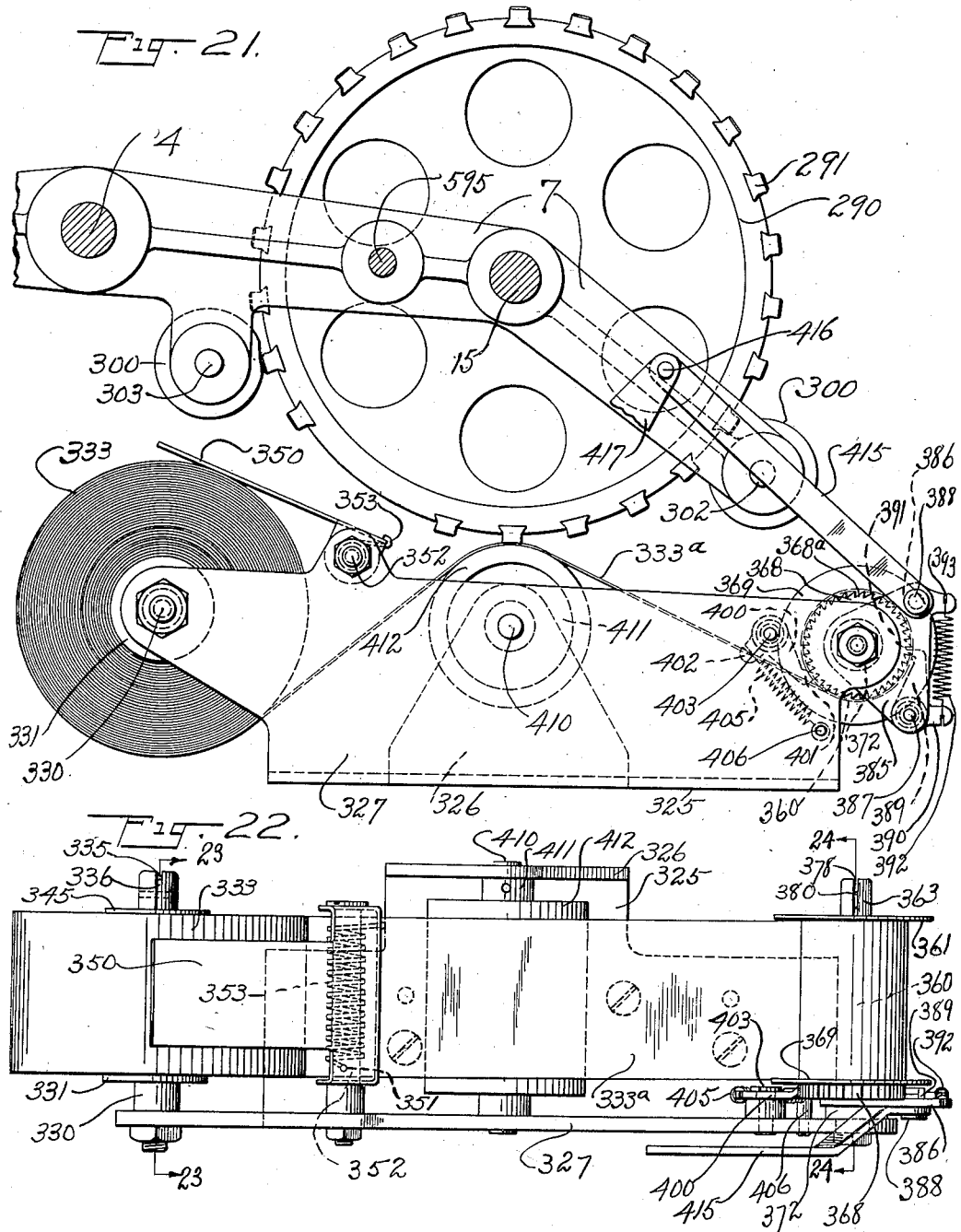

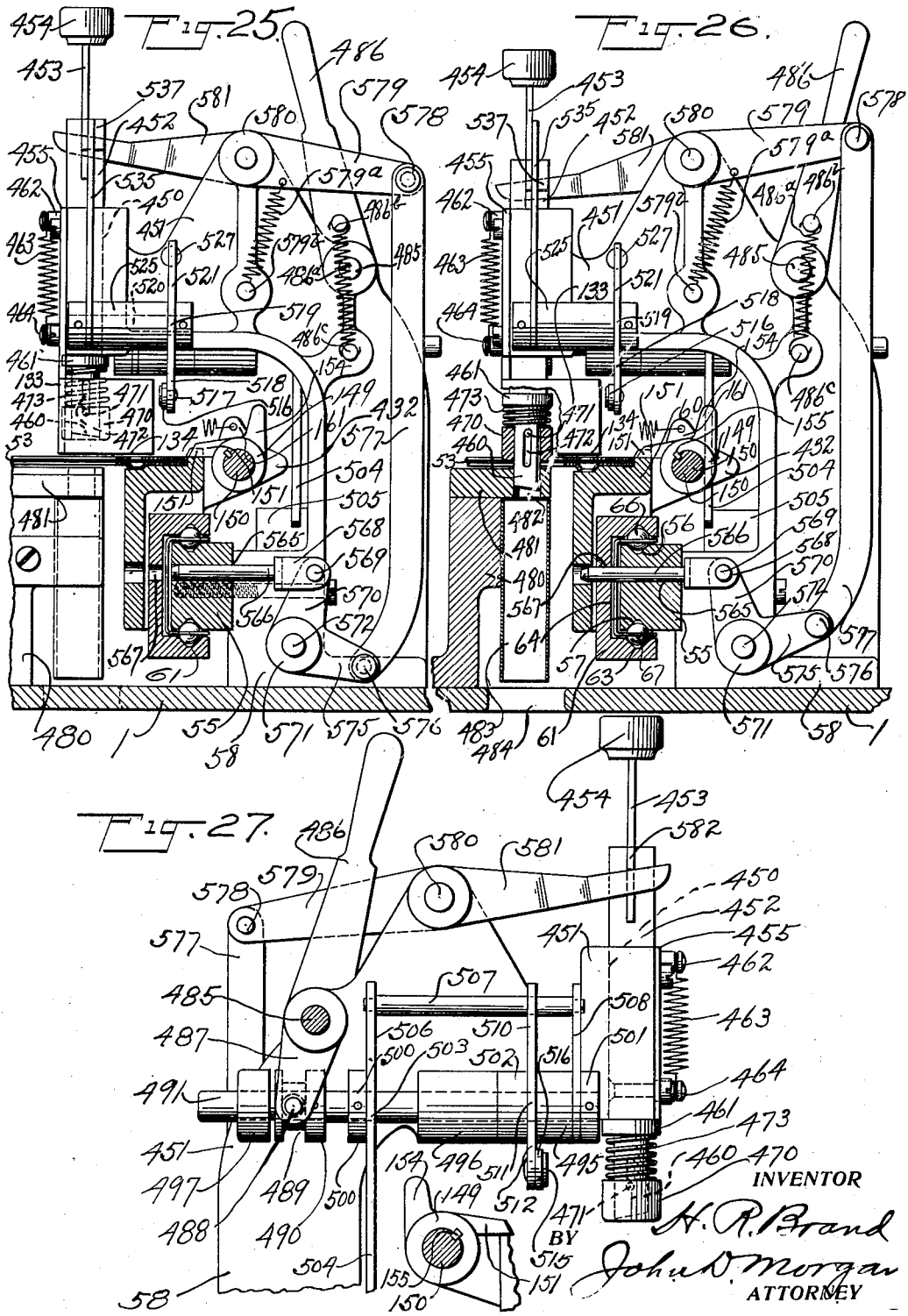

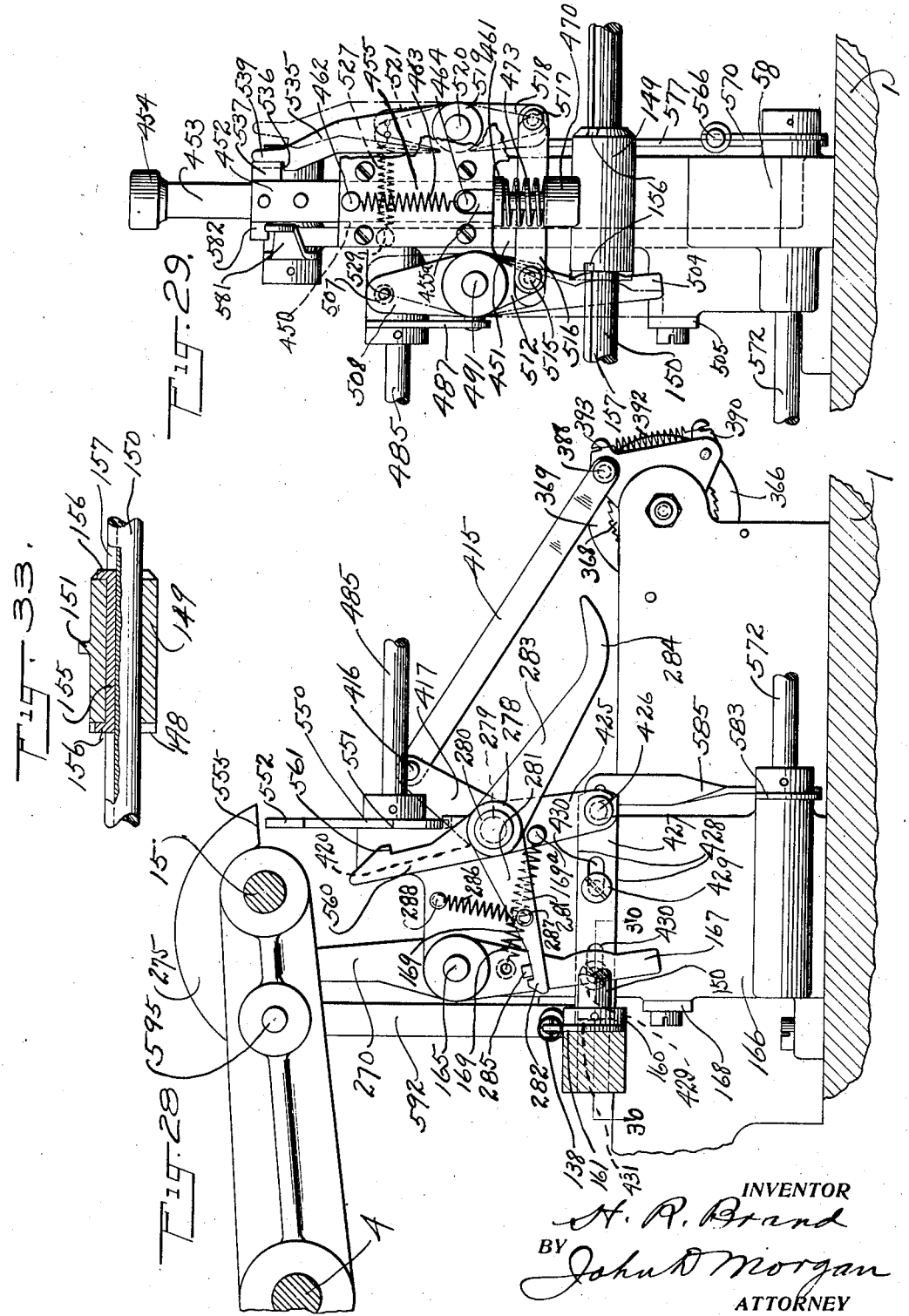

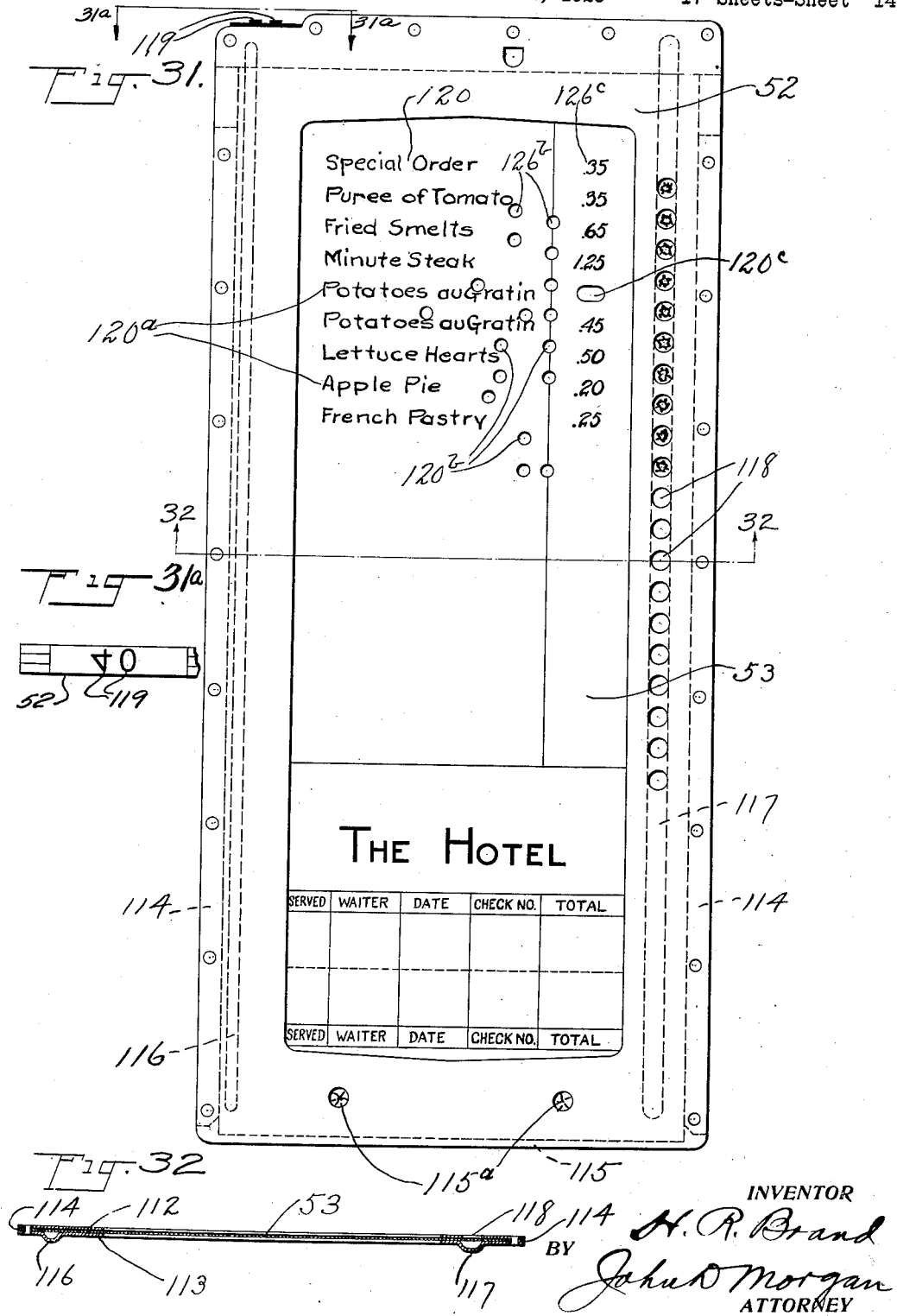

Sept. 4, 1928. 1,682,828
H. R. BRAND
MECHANISM AND METHOD FOR CONTROLLING BUSINESS
Filed March 27, 1923 17 Sheets-Sheet 15
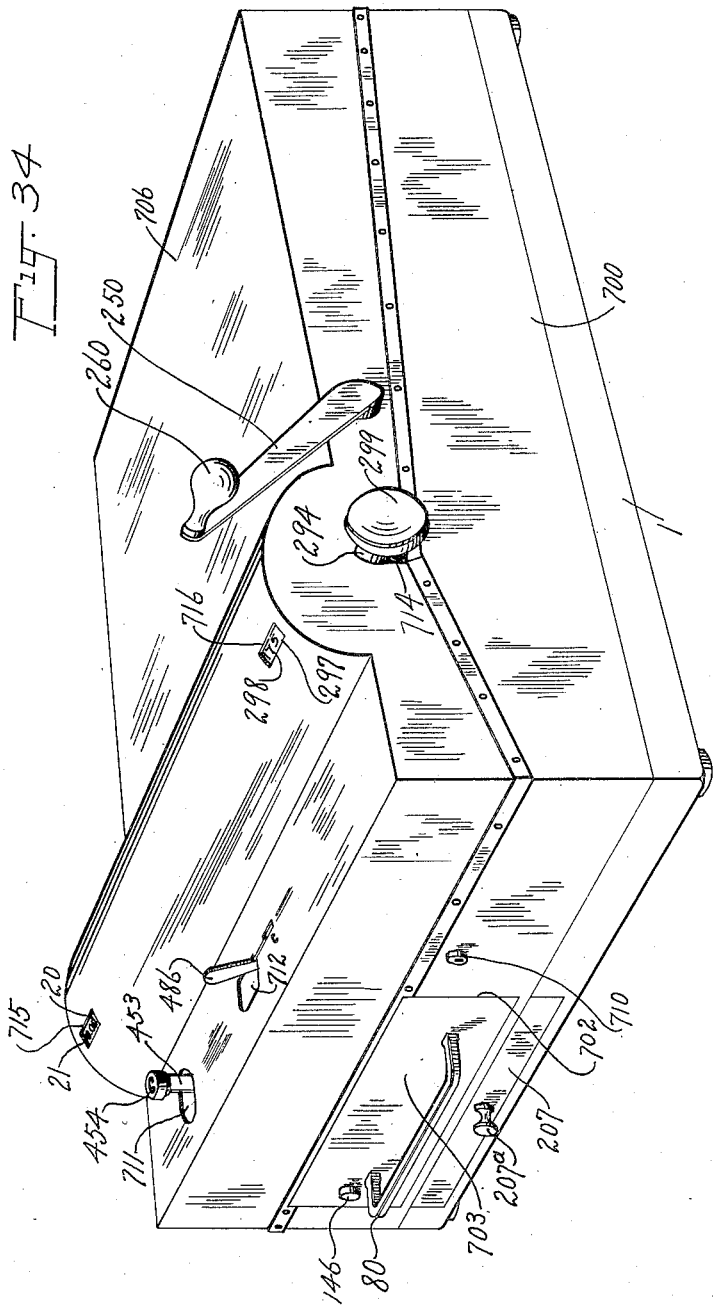

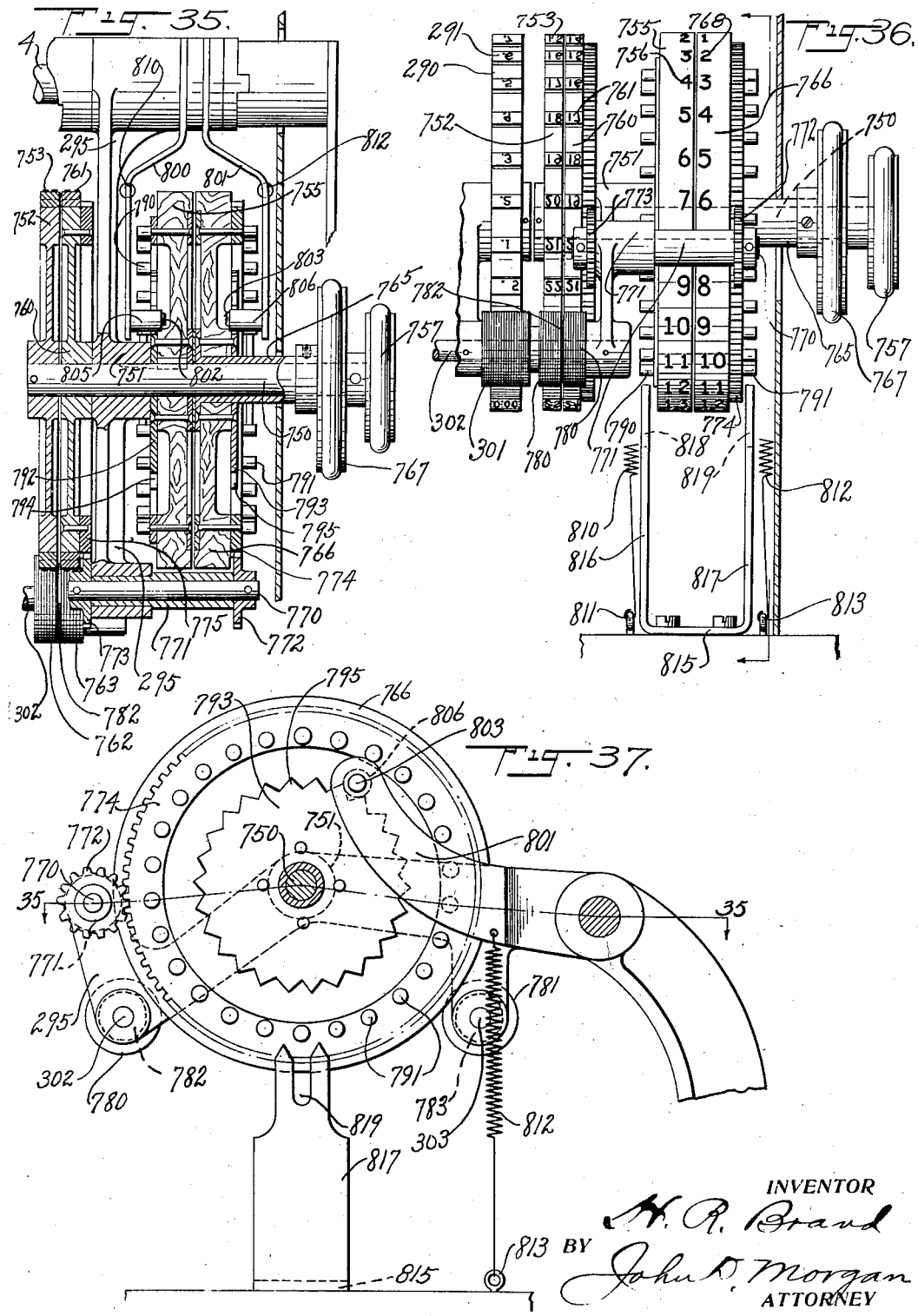

Sept. 4, 1928.

H. R. BRAND 1,682,828

MECHANISM AND METHOD FOR CONTROLLING BUSINESS

Filed March 27, 1923   17 Sheets-Sheet 17

INVENTOR
H. R. Brand
BY
John D. Morgan
ATTORNEY

Patented Sept. 4, 1928.

1,682,828

UNITED STATES PATENT OFFICE.

HARRY RUSSELL BRAND, OF NEW YORK, N. Y.

MECHANISM AND METHOD FOR CONTROLLING BUSINESS.

Application filed March 27, 1923. Serial No. 628,028.

The invention relates to novel and useful machines and methods for use in controlling a business, and more especially to such machines or methods for controlling and recording transactions relating to other than standard or usual commodities, and cooperating with mechanisms and methods for controlling and recording the transactions relating to standard or usual commodities.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:—

Fig. 5 is a partial front elevation of the machine, on an enlarged scale, partly in section, other parts being broken away and omitted;

Fig. 6 is a fragmentary elevation of the machine looking from the left side of Fig. 1 and with the casing broken away;

Fig. 7 is a fragmentary elevation on an enlarged scale partly in section, showing a part of the mechanism illustrated in Fig. 6 and looking from the right hand side thereof;

Fig. 8 is a fragmentary detail of certain parts shown in Figs. 6 and 7;

Fig. 9 is a fragmentary elevation, on an enlarged scale, of a wheel and associated parts, shown at the extreme right of Fig. 1, looking from the left;

Fig. 10 is an elevation, on an enlarged scale, of certain parts of the punching mechanism partly in section on the line 10—10 of Fig. 1, and looking from the left side thereof;

Fig. 11 is a view corresponding to Fig. 10, but showing the mechanism in another position, and with added parts;

Fig. 12 is a fragmentary elevation, on an enlarged scale of a portion of the machine shown at the right of Fig. 3, partly in section;

Fig. 13 is a plan of the carrier mechanism with parts broken away and other parts removed;

Fig. 14 is an elevation of the mechanism shown in Fig. 13 on an enlarged scale, looking from the lower side, with parts broken away and certain parts omitted;

Fig. 15 is an elevation of the mechanism shown in Fig. 13, partly in section and looking from the upper side of Fig. 13;

Fig. 16 is a fragmentary detail, on an enlarged scale, of certain parts shown in Fig. 15;

Fig. 17 is a sectional elevation, on an enlarged scale, on the line 17—17 of Fig. 13, looking in the direction of the arrows, but with certain parts removed;

Fig. 18 is a sectional elevation on an enlarged scale of the carrier return driving mechanism;

Fig. 19 is a sectional elevation on an enlarged scale on the line 19—19 of Fig. 18, looking in the direction of the arrows;

Fig. 20 is a sectional elevation on an enlarged scale on the line 20—20 of Fig. 18, looking in the direction of the arrows;

Fig. 21 is a fragmentary elevation on an enlarged scale of the tape printing and feeding mechanism;

Fig. 22 is a plan of a portion of the mechanism illustrated in Fig. 21;

Fig. 23 is an elevation, in section, of the mechanism, shown at the left of Fig. 22, and on the line 23—23 looking in the direction of the arrows;

Fig. 24 is an elevation, in section of the mechanism shown at the right of Fig. 22, and on the line 24—24 looking in the direction of the arrows;

Fig. 25 is a fragmentary elevation, partly in section and on an enlarged scale, of the cancelling mechanism and associated parts, shown in the lower central part of Fig. 1;

Fig. 26 is a fragmentary elevation, partly in section, of the mechanism shown in Fig. 25, but with portions of the mechanism in another position;

Fig. 27 is a fragmentary elevation of a portion of the mechanism shown in Fig. 25, looking from the other side;

Fig. 28 is an elevation corresponding to Fig. 4, but with portions of the mechanism removed and other parts in a different position;

Fig. 29 is an elevation of certain parts shown in Fig. 25, looking from the left hand side thereof;

Fig. 30 is a section on line 30—30 of Fig. 28, of a detail, looking in the direction of the arrows;

Fig. 31 is a plan view, on an enlarged scale, of the insert and holder for use in the machine, and showing the printing, perforating and cancelation effected by the machine;

Figure 1:
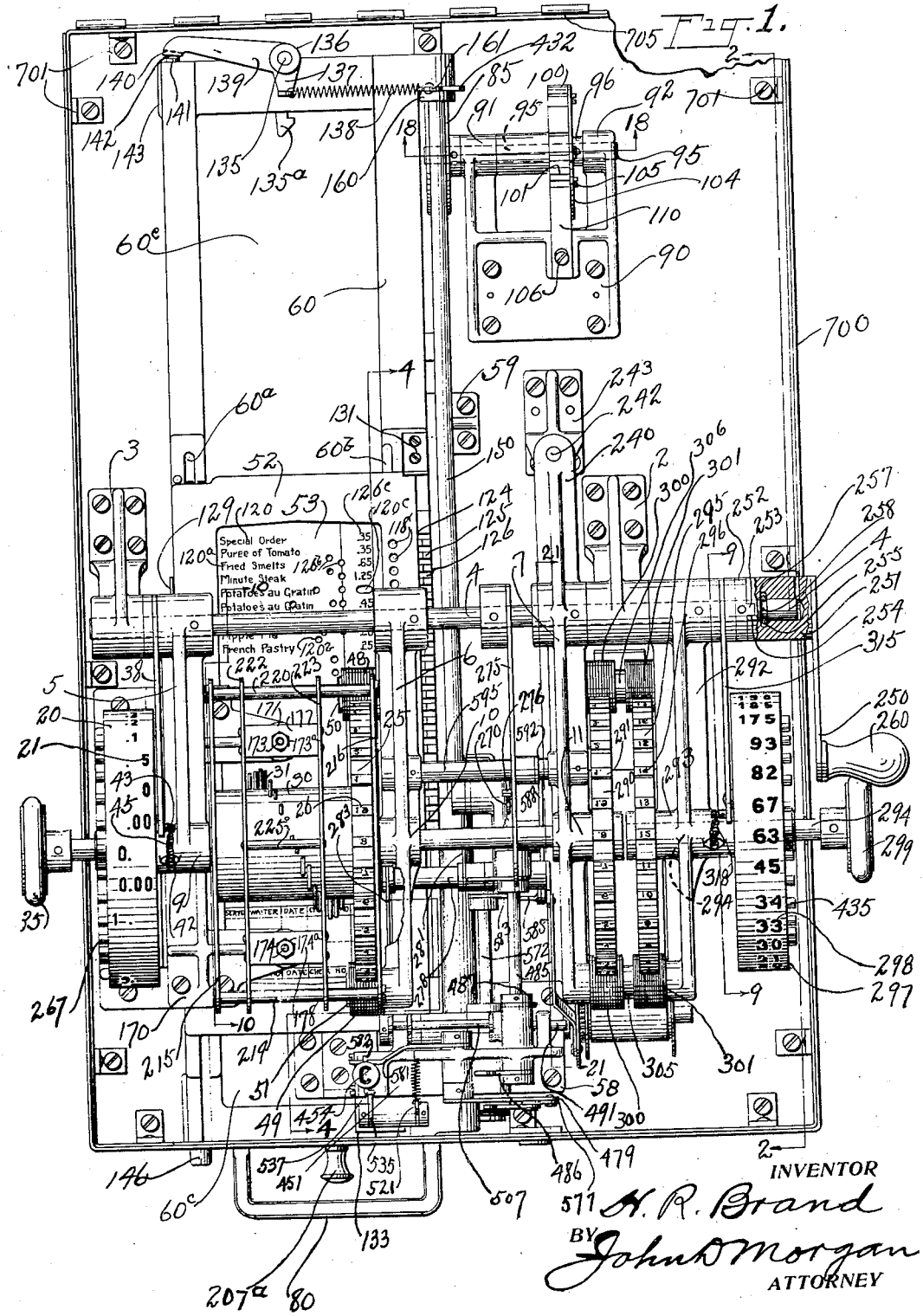
Fig. 1 is a plan of a machine embodying the invention with certain parts in section and a part of the inclosing casing removed, and with a carrier shown in one extreme inner position.

Fig 31ᵃ is a detail, on an enlarged scale, of a portion of the upper left hand corner of Fig. 31, looking in the direction of the arrows and showing the printing types;

Fig. 32 is a section on the line 32—32 of Fig. 31, looking in the direction of the arrows;

Fig. 33 is a detail, on an enlarged scale, partly in section, showing the construction of a portion of the carrier arresting device;

Fig. 34 is an isometric perspective of the machine, on a reduced scale, looking from the lower right hand corner of Fig. 1;

Fig. 35 is a plan view in section of an improved modified form of the parts shown at the right hand central portion of Fig. 1;

Fig. 36 is an elevation of the parts shown in Fig. 35;

Fig. 37 is a view of Fig. 35 in side elevation, looking from the right hand side thereof;

Fig. 38 is a fragmentary view of a page of the special order register or record book;

Fig. 39 is a view of the preferred form of special order slip;

Fig. 40 is a view of the preferred form for canceled order slip when cancelation is made before delivery of the commodity;

Fig. 41 is a view of a canceled order slip similar to the form shown in Fig. 40, and used when cancelation is made after delivery of the commodity.

A relatively brief general description of the invention, as preferably embodied, is given, for the sake of clearness, and this is followed by a full detailed description of such embodiment, and both descriptions are applied to the restaurant business as exemplary of commodity purveying or handling businesses generally, so far as the broader aspects of the invention and its more general applications are concerned. It will be understood that said descriptions are to be regarded as explanatory and exemplary of the invention and not as restrictive thereof.

The invention, in one of its most useful and general applications or capacities, relates to, and is a unit in, a system of business control for an organization dispensing or selling, or analogously handling, commodities, as set forth in my copending application filed Jan. 6, 1922, Serial No. 527,516, and other applications of mine.

The invention is illustrated and described in connection with the sale of food commodities in a restaurant, but in its broad aspects, and as a functioning unit, is adaptable for, and may be applied to a like purpose in other industries.

An object of the invention is to provide means for marking, on a sales card, bearing the name or names of, or other indicia relative to, articles sold or dispensed or otherwise handled, the price of an order or other transaction previously entered without the price, which latter it is necessary or convenient to determine after the order has been recorded, and further to make completely adequate records of the transaction either immediately or through cooperation with other mechanisms or features of my system of business control.

As an exemplary application of the invention in the ordinary operation of a restaurant, a guest may request a specially prepared combination of food which is not listed on the menu and the preparation of which consumes special time and materials. In such a case, after the order has been taken, it is necessary to determine the selling price, usually preliminary to the execution of the order, and to so charge the purchaser. Also in accordance with the present preferred practical application of the system described in my said copending application Ser. No. 525,516, it is desirable or essential to record a charge or other record of the sale both against the stations or agents involved in the transaction and the waiter accepting and delivering the order.

The machine of the invention is one for performing the desired charge operation including that on the sales card or guest check, these latter operations, in the present exemplary embodiment, consisting of printing the predetermined price of a previously printed entry and simultaneously perforating the card with representations of this price, which perforations are recognizable by, and control certain operations of certain cooperating machines. The characters thus printed and their corresponding perforations thus made are preferably so placed relatively to the name or indication of the article priced as to be identified therewith.

One of the important features of the machine is the recordation, simultaneously with the performances of said operations on the guest check, on a record strip within the machine and inaccessible to the operator, of a duplicate or equivalent entry to that made by the machine on the guest check itself (as already generally described) and charging on this record the selling price of the commodity against the waiter or other person making the sale.

In first recording the order given by the guest and charging it against the special order or other station, a machine is used of the class described in my said copending application Ser. No. 527,516, and usually styled the "controller". The insertion of the guest check within the "controller" prints "special order" on the check, utters to the waiter or other operator a commodity identifying token, and charges to the station at which the machine of the invention is located one "special order". Such a charge-receiving mechanism is described and illustrated in my copending application filed March 30, 1922, Serial Number 548,250, as is also a token-receiving mechanism cooperating therewith to cancel this charge upon the commodity identifying token being inaccessibly deposited therewithin.

The sales card or guest check, carrying the items of a complete order of a guest with their price perforations, is used in another machine, as described in my copending application filed May 19, 1922, Serial Number 562,229, for totalizing operations; the perforations coacting with mechanism to produce the sum of the charges and printing the latter as a footing on the guest check.

In the present preferred embodiment and practice of this invention, and in connection with the transaction, for the purpose of making a complete sales record there are provided, as auxiliary to the machines referred to, an order register for recording data relative to the commodity and the identity of the waiter, and an order book consisting preferably of stubbed slips in duplicate, serially numbered, one of which slips is both the order on the chef for the commodity and his receipt for the delivery of the article. The other copy of this slip is held by the agent at the issuing station to complete the record of the transaction.

For convenience, the machine of this invention is called "a special order" machine and is located at a convenient station in the establishment, at which station is also located both the special order charge recording and the cooperating token receiving mechanisms. Here also are kept the order register and the order book and such data as may be desired.

Another important feature of the invention is the mechanism provided for canceling an item on the guest check after its price has been printed upon the check, and the corresponding perforations have been made. Such an operation may be required, for example, in case of error in originally marking the check, in case of recording a wrong order or in case of the revocation, by the guest, of an order correctly interpreted and so recorded and marked on the check.

In connection with the canceling operation, it is also desirable to make certain records, and to that end there are preferably provided two differing sets of stubbed slips, the slips of each set being in duplicate and being serially numbered. The slips of one of these sets are issued in case the cancelation is made prior to delivery of the commodity by the chef, and the slips of the other set are issued in case the cancelation is made as or after the order is delivered to the guest.

The first-mentioned set of slips is located preferably at the special order machine station and are used to record the entries and issuances made by that station, where and when the guest's check is altered. The duplicate slip for the canceled order is exchanged for the token identifying the order. The other set of slips are preferably in the hands of the dining room captain or other responsible party, and after issuance of both slips to the waiter, the original slip is turned in at the above-referred to station as authority to cancel the order on the guest's check.

The records of the issuance of the slips are kept on the stubs, and the original of each is deposited in a receptacle, located preferably adjacent to the special order machine, while the duplicates are retained by the waiter or other sales agent involved. The deposited slips are accessible only to those authorized to collect them.

The invention provides means for marking the check or the like, to indicate or record thereon such a cancelation of an order, such means operating preferably to perforate the check in a pre-determined position relative to the item to be canceled. This perforation is preferably of such dimension or position as to cut out or to obliterate the price of this item or order, and this perforation is further adapted to be recognized by the totalizing machine referred to in a manner to prevent the inclusion of the canceled price in the total selling price of the purchased commodities represented on the guest check or like record.

In order that the printing, perforating and canceling operations be properly performed, it is necessary that the check or insert on which these operations are to be performed should be correctly placed and so held in the machine. To this end, the check is preferably supported in a frame of suitable construction, and mechanism is provided for receiving, holding and supporting the check and its frame, for positioning the check relatively to the coacting mechanism and for maintaining it in such a predetermined position for the performance of the indicated functions. Devices are also provided for preventing the operation of the printing and perforating mechanism unless the guest check or like record is in its correct mark-receiving position.

Means are also provided for preventing the operation of the canceling mechanism during the price printing and perforating, and for locking the price printing and perforating mechanism while the cancelation is being performed.

The machine is constructed with a base 1 (Figs. 1, 2, 3, 4, 5 and 6), which has mounted thereon and fixed thereto the brackets 2 and 3 rotatably carrying in bearings at their free ends the shaft 4. The arms 5, 6 and 7 are fixed to the shaft 4 and respectively have the bearings 9, 10 and 11 in which a shaft 15 is freely mounted.

Selectively settable price imprinting means are provided, and as embodied, adjacent the outer face of the bearing 9, is a flanged disk 20, (see also Figs. 7 and 34), fast on the shaft 15 and carrying on its peripheral surface regularly spaced indicating numerals 21. Adjacent a face of the bearing 10, and also fast on the shaft 15, is a wheel 25 (see also Fig. 10), and having fixed on its periphery printing type 26, regularly spaced, and preferably equal in number to, and of the same characters, as the numerals 21.

Between the wheel 25 and the opposed face of the bearing 9 is a cylinder 30, fast on the shaft 15, (Figs. 1, 3, 5, 10 and 11), and has protruding from its peripheral surface a series of pins 31, spirally arranged and corresponding in number to the number of type 26 relatively and suitably placed for coaction with other parts as is hereinafter described.

Means are provided by the invention for rotating the shaft 15 and its connected parts and for holding the shaft 15 in any desired adjusted position. As embodied a hand wheel 35 (Figs. 1, 3 and 7) is fast on the free outer end of the shaft 15 and adjacent the disk 20. Fast also to shaft 15 (Figs. 6, 7 and 8) between the adjacent face of the bearing 9 and the hub of the disk 20 is a star wheel 36 with the teeth 37 indexed to correspond to the angular disposition of the type 26 and the numerals 21.

An arm 38 (see also Figs. 1, 3 and 5) is freely mounted on the shaft 4 and carries fixed at its free end a stud 39 upon which is rotatably mounted a roller 40, adapted to act with and between the teeth 37. A spring 42, under tension, has one end attached to a pin 43 fixed in the arm 38, the opposite end being suitably held by a stud 44 fast in the bearing 9, the action of the spring 42 being such as to cause frictional engagement between the roller 40 and the star wheel 36.

The machine, as constructed, has two blank spaces on the type wheel 25 and in order that this type wheel may be permitted to be rotated clockwise and anti-clockwise through such angular distance as will not interfere with other parts, a piece 45 is fixed on a face of the star wheel 36 (Figs. 6, 7 and 8) placed to engage with the roller 40 and to be arrested thereby when approaching from either direction.

It will be evident from the foregoing that the shaft 15 and its connected parts may be rotated through a limited distance in either direction by manual operation of the hand wheel 35; that the roller 40 and spring 42 are adapted to retain the shaft 15 and the type wheel 25 in any predetermined position but permitting their rotation; and that the cooperation of the roller 40 and the piece 45 serve to give a limiting position at the end of the permitted rotation in either direction.

Means are also provided by the invention to ink the type 26, and as embodied, consists of rollers 48 and 49 (Figs. 1, 5, 6, 10 and 11) whose peripheral surfaces are made of a suitable material, such as felt, adapted to take up printing ink. Studs 50 and 51 fixed in the arm 6, rotatably carry the rollers 48 and 49 which rollers are suitably positioned in contact with the impression surfaces of the type 26, and rotated thereby during the normal operation of the shaft 15.

The embodied form of the invention is adapted to use, both in connection and cooperating with certain parts and functions of the machine, as further described, a frame 52 (Fig 31) constructed to carry an insert 53 upon the exposed surface of which operations have been performed, and, as hereinafter fully set forth, further impressions and marks are made.

This device is similar to that illustrated and embodied in the copending application for Letters Patent of Auguste L. Saltzman, Ser. No. 440,502 filed February 12, 1921.

The frame and insert are also illustrated and used in connection with a controlling machine, as embodied in my copending application for Letters Patent Serial No. 527,516 filed Jan. 6, 1922, which machine, as illustrated, is adapted for instance to print commodity items and prices thereof upon the carried insert, and to perforate the latter when desired with marks representing such prices.

This referred to machine, is also adapted by omitting certain parts, to print only a name, such for instance as "Special order" and make no price representing perforations, and to which item the present embodiment of the machine herein described prints a desired price and makes perforations representing such price all in a relative position on the insert, to both the previously printed line and to certain other parts of the insert frame, all as is hereinafter fully set forth.

Means are provided, within the machine to support, guide and carry frame 52 and its insert 53 to the desired operative position.

Referring to Figs. 1, 3, 5, 13, 15, 16, 17 and 26 a bar 55 has formed in opposed faces the V grooves 56 and 57 and is fixed to the brackets 58 and 59, fast on the base 1. The bar 55 is placed at substantially right angles to the axis of the shaft 15 and parallel to the base 1.

A skeleton frame-like carrier 60 (Figs. 1, 5, 13 and 16) with the opening 60°, is adapted for reciprocating travel and has fixed to one side a channel 61 (see also Fig. 15). In the opposed inner surfaces of the channel are formed the V grooves 62 and 63 substantially the same as, but opposed to the grooves 56 and 57 respectively. A slider cage 64 is partially encased by the channel 61 and partially embraces the bar 55, and freely carries the balls 66 and 67 which latter are adapted to run respectively in the grooves 56 and 62 and 57 and 63. The carrier 60 is thus supported at one of its edges and provided with suitable guiding means for free travel longitudinally.

The opposed edge of the carrier 60 (Figs. 3, 5, 13, 14 and 17) has also a channel shaped piece 70 fixed thereto, the inner surfaces 71 and 72 of the flanges adapted to run on a roller 75, which is rotatably mounted on a stud 76 fast in a bracket 77, fixed on the base 1. The bearing surfaces and coacting parts above described control the travel of the carrier in a fixed plane parallel to the base 1.

A handle 80 (see also Fig. 34) is fast on one end of the carrier 60, for manually drawing the carrier outwardly.

Means are provided by the invention to compel the travel of the carrier, when desired, in the other or rearward direction, and as embodied, consists of a plate 83 (Figs. 5, 13, 15 and 17) suitably fastened to the channel piece 61, intermediate of its ends, to which is attached one end of a flexible tape 84, the other end of which is fixed to a screw 86 fast in a flanged pulley 85 (Figs. 18 and 20). The tape is preferably wound about the pulley 85 sufficiently to permit the reciprocation of the carrier 60.

A bracket 90 (see also Figs. 1 and 2) is fixed on the base 1; it has upwardly projecting arms supporting the bearings 91 and 92 in which is rotatably carried the shaft 95 to one end of which is fixed the pulley 85. A collar 96 fixed on the shaft 95, near the other end, has fast thereto a pin 97 to which is suitably fastened a spiral spring 98, Fig. 18, under tension. Freely mounted on the shaft 95 intermediate of the bearing 91 and the collar 96 is a hubbed hollow drum 100, see also Fig. 19, within which is carried the spring 98 and to the flange of which is fastened the outer end of the spring 98 by means of the stud 102. A plate 104 held by the screws 105, which are fastened to the web of the drum 100 serves to retain the spring 98 within the drum.

The periphery of the drum 100 has formed thereon the teeth 101, 101, coacting with which, to resist the rotative action of the spring 98, is the free end of a spring plate 110 (Figs. 1 and 2), the other end of which is fast on the bracket 90 at 106. It is obvious that the tension of the spring 98 may then be varied to meet the desired action of the carrier travel.

The insert holding device, already mentioned, will now be more specifically described. This device comprises a skeleton frame 52 (Figs. 31 and 32) open front and back, and is provided with two plates 112 and 113, fixed one to the other with a suitable space therebetween, the spacing members 114—114 on their edges acting as the retaining strips for the insert 53. One end 115 is open for the insertion and removal of this insert. The openings of the frame 52 permit the ready insertion and removal of the insert 53. The insert is detachably fixed in the frame at 115ª.

The lower plate 113 of the frame 52, has the protruding ribs 116 and 117 unequally spaced from the adjacent edges of the frame and differ in widths.

Apertures 118, 118 bear a definite relationship to the matter printed on the insert as do the perforations representing such matter.

Identifying means, such as the type 119, are carried on an edge of the frame 52, and preferably corresponding to the number, for instance, of a selling agent, who has disposed of the articles enumerated on the insert.

The printed words " Special order " shown at 120, together with the various other items 120ª representing commodities and their respective price-representing perforations 120ᵇ have been previously made by the controlling machine as embodied in my copending application Serial No. 527,516, as already referred to. These perforations are recognized by a computing machine, such for example as that shown in my copending application Ser. No. 562,229, filed May 19, 1922.

Means are also provided to locate and detachably hold the frame 52 upon the face of the carrier 60 and, as shown in Figs. 1, 13, 14 and 17, a ledge 124 is formed along one edge of the carrier 60, the opposed edge of which carries fixed thereto the spring pieces 129, and 130, for pressing the frame 52 against the ledge 124. A piece 131, fixed to a face of the carrier 60 acts as an abutting stop against the impelling force of a spring blade 132 which is also fixed to the carrier 60.

Means whereby the frame 52 must be placed on the carrier in one predetermined position only in order to permit the carrier to reach a desired operative position will now be described. A groove 60$^a$ and a depression 60$^b$, Figs. 1, 5, 13 and 17, respectively, are adapted to receive the ribs 116 and 117, on the frame 52. Suitably mounted on the bracket 58 (see also Figs. 4, 25 and 26) is an angle-plate 133 having its edge 134 so positioned relatively to the carrier 60 that there is a slight clearance between this edge 134 and the frame 52, when the latter is suitably positioned on the carrier with the ribs 116 and 117 in the groove 121 and depression 122 respectively, and the stops 129, 130, 131 and 132 properly acting on the frame 52.

It will be evident from the foregoing that, placed in any other position on the carrier, some part of the frame 52 will interfere with the edge 134 of the plate 133 and the carrier 60 prevented from reaching the desired operative position.

The embodied form of means for maintaining, for a desired period, the carrier 60 in its extreme outward position consists of a rock-shaft 135 (Figs. 1, 13 and 14), rotatably mounted in bearings on the rearward end of the carrier 60 and has fast on one end a bell-crank 136, one of whose arms 137 has attached thereto one end of a spring 138, under tension, the other end of which is attached as hereinafter described. The other arm 139 has a projection 140 operatively placed with relation to an end 142 of the push rod 141, which is slidably mounted in guides 143 and 144 in the carrier 60. A spring 145, under compression, embraces the forward end of the rod 141 and has one end in contact with a face of the guide 144 and the other end in contact with a head 146, fixed on the forward end of the rod 141, which extends beyond the adjacent end of the carrier 60 (see Fig. 34).

The lower end of the rock shaft 135 has fast thereon an arm 135$^a$, whose free end is hook shaped. A stud 135$^b$ fixed in the base, 1, suitably shaped and positioned for coaction with the arm 135$^a$ is adapted to be engaged by the hook thereof, when the carrier 60 has been drawn outwardly to its extreme position and to so maintain this condition under the action of the spring 138 until such time as the arm 135$^a$ is rocked out of engagement therewith, by means of suitable pressure on the head 146.

Means are provided by the invention for variably positioning the carrier 60, during its rearward travel, in any one of a number of predetermined positions for such operations on the insert as are hereinafter described. As embodied, a rock shaft 150 (Figs. 1, 3, 4, 5, 13, 15 and 17) is rotatably mounted on the carrier 60, from front to rear thereof and adjacent to the ledge 124, which latter has formed on its upper edge the teeth 125 with the spaces 126 therebetween. The spaces 126 are equi-distant and from center to center exactly equal to the distance between the center of the holes 118 of the frame 52.

Slidably mounted on the shaft 150 is a hub 149 (Figs. 5 and 13) with the face 148 and having projecting therefrom an arm 151 adapted, when desired, closely to engage between the teeth 125. An arm 154 also projects from the hub 149 approximately at right angles to the arm 151 and is adapted for manually rotating the hub 149. A spline 155 (see Fig. 33) held in the hub 149 by the heads 156, 156 is adapted to slide in the keyway 157 of the shaft 150, it being evident that the partial rotation of the hub 149 by means of the arm 154 will give the same angular movement to the shaft 150.

A sleeve 150$^a$ (Figs. 13 and 15) is mounted on the shaft 150 and acts as a convenient stop for the hub 149, when slid in one direction while a pin 150$^b$ serves the same purpose for the reverse travel.

A hub 160, see also Fig. 1, fast on the rock shaft 150, adjacent to its rear bearing, has an arm 161 to which is suitably fastened the spring 138 which, being under tension as hereinbefore described, will tend to rock the shaft 150 in a counter-clockwise direction.

From the foregoing it will be evident that, when the carrier 60 is drawn out, by rocking the shaft 150, clock-wise, a suitable distance, the arm 151 may be disengaged from the teeth 125 and may then be moved axially along the shaft 150 and placed in any other of the spaces 126, the spring 138 giving the reverse rotation to the shaft 150, and maintaining the desired position by causing engagement of the arm 151 with the teeth 125.

As further embodied, a rock shaft 165 (see Figs. 3, 4 and 28) is rotatably mounted in a bracket 166, fast on the base 1. A depending arm 167 is fixed on the end of the shaft 165 adjacent to the carrier 60 and is operatively placed in the path of the hub 149 for coaction with the face 148. A plate 168 fast on the bracket 166 is adapted to act as a stop for the arm 167 when the latter is forced backwardly by the carrier 60 under action of the spring 103, and thus the carrier 60 and the supported insert 53 is held in the desired predetermined position. A spring 169, under tension, has one end attached to the arm 167, the other end being fast at 169ᵃ on an arm hereinafter mentioned, the spring tending to keep the arm 167 in an advanced position. This operation of the arm 167 by the hub 149, when the carrier has reached the limit of its inward travel, serves to unlock the printing mechanism, as will be later described.

As briefly referred to, means are provided for marking or perforating the insert 53 and in the embodied form of such means a bracket 170 (Figs. 1, 3, 5, 10 and 11) fixed to the bracket 77 has the upwardly projecting lugs 171 and 172 in which are slidably carried the rods 173 and 174, respectively. Springs 175 and 176, under compression, respectively, bear against the upper faces of the lugs 171 and 172 and the opposed surfaces of the channel-plates 177 and 178, which latter are fixed against shoulders on the rods 173 and 174 by means of the nuts 173ᵃ and 174ᵃ respectively. The shouldered portions 179 and 180 of the respective rods 173 and 174 at their opposed ends act as limiting stops against the action of the springs 175 and 176.

Fixed to the lower ends of the rods 173 and 174 is a plate 185 which acts as a bridging member to make a unitary structure and is located between the pins 31 and the carrier 60. Suitably disposed with respect to the pins 31 is a series of punches 190, each punch corresponding to a pin 31, and arranged transversely relative to the carrier 60, suitably disposed relative to the opening 60ᶜ thereof, and slidably mounted in the plate 185. Intermediate of their ends, the punches 190 each have the shouldered portions 191 with the faces 191ᵃ and 191ᵇ, the latter resting on the plate 185. Each of the punches 190 is further slidably guided, near its upper extremity, in a plate 192 which is fixed on the surface of the plate 185, and, at their lower extremity, by a stripper plate 193, to which are fixed studs 194, 194, the latter slidably mounted in the plate 185. The springs 195, 195 under compression, are disposed about the studs 194, 194, their opposed end abutting the plates 185 and 193. The heads 196 of the studs 194 maintain, when desired, the plate 193 in a suitably fixed position against the action of the springs 195.

A bracket 200, Figs. 5 and 11, is fixed on the base 1 and carries fast on its upper edge a die plate 201, suitably disposed relative to the carrier 60 and its opening 60ᶜ, the die plate 201 having the dies 202 each of which is in operative alignment with its respective punch 190. With the machine at rest the opposed surfaces of the die plate 201 and the stripper plate 193 are spaced apart sufficiently to permit the passage of the frame 52 and its insert 53 therebetween.

An open-ended chute 205 (Figs. 5 and 11) is fixed to the bracket 200 beneath the die plate 201, and forms a passageway from the dies 202 to an opening 206 (see Figs. 3 and 11) in the base 1. A drawer 207 open at the top, is slidably mounted on the guides 208 and 209 fixed to the under side of the base 1 and adapted to be drawn outwardly, a knob 207ᵃ (see Fig. 34) being affixed to the front face of the drawer for the purpose.

Referring again to the punch-carrying device, two yokes 215 and 216 (see Figs. 1, 3, 5, 10 and 11) embrace the shaft 15, the slotted portions 217 and 218 respectively being adapted to permit the desired operative freedom of the shaft 15. The studs 219 and 220 are fixed to the yokes 215 and 216 on either side of the shaft 15, and make of the yokes a rigid unitary structure.

Intermediate of the yokes 215 and 216, and centered on the studs 219 and 220, are bridging members 222 and 223 to which are rigidly fixed the channel plates 177 and 178. A shouldered stud 225 is used to further stiffen the bridging members 222 and 223, the opposed ends being riveted thereto.

On the shaft 15, within the slotted portions 217 and 218 of the yokes, are freely mounted the rollers 230 and 231, respectively, and adapted to coact with the edges 233 and 234 of the respective slotted portions 217 and 218.

Means are provided for positioning the shaft 4 while at rest and also for oscillating this shaft and thus through the connected and cooperating parts carry the type wheel 25 to impression, and the pins 31 to cause the punches 190 to perforate the insert 53 suitably presented thereto. As embodied, an arm 240 (Figs. 1, 2 and 4) extends rearwardly from the arm 7 as a part thereof, and at its free end carries the shouldered stud 242. Adjacent the stud 242 is a bracket 243 fast on the base 1 and adjustably carrying a screw 244 whose head 245 is in the path of and adapted to coact with the stud 242.

Figure 2:
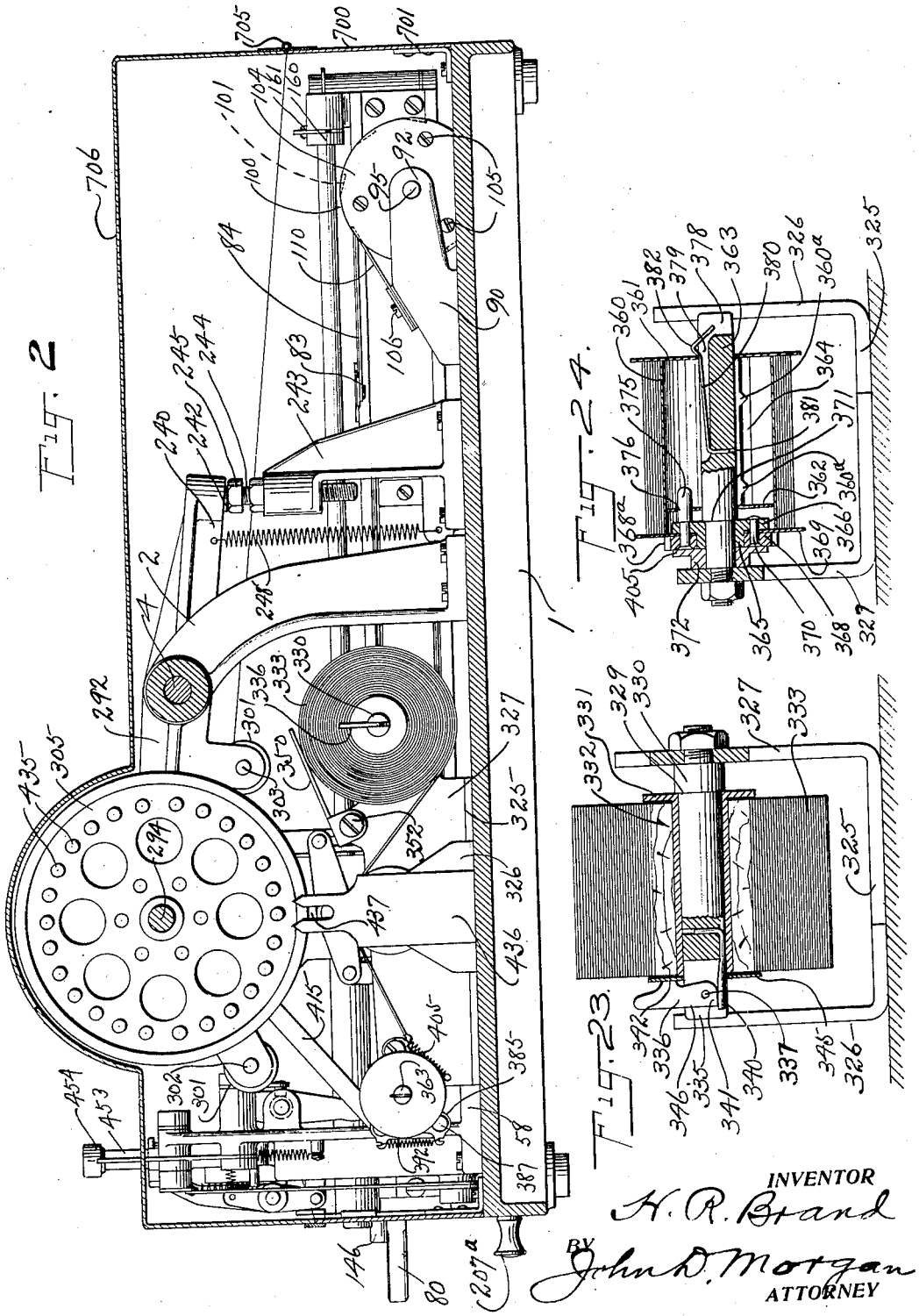
Fig. 2 is a side elevation of the machine, partly in section, looking from the right hand side of Fig. 1 and with certain parts omitted, the section being on the line 2—2 of Fig. 1.
Figure 3:
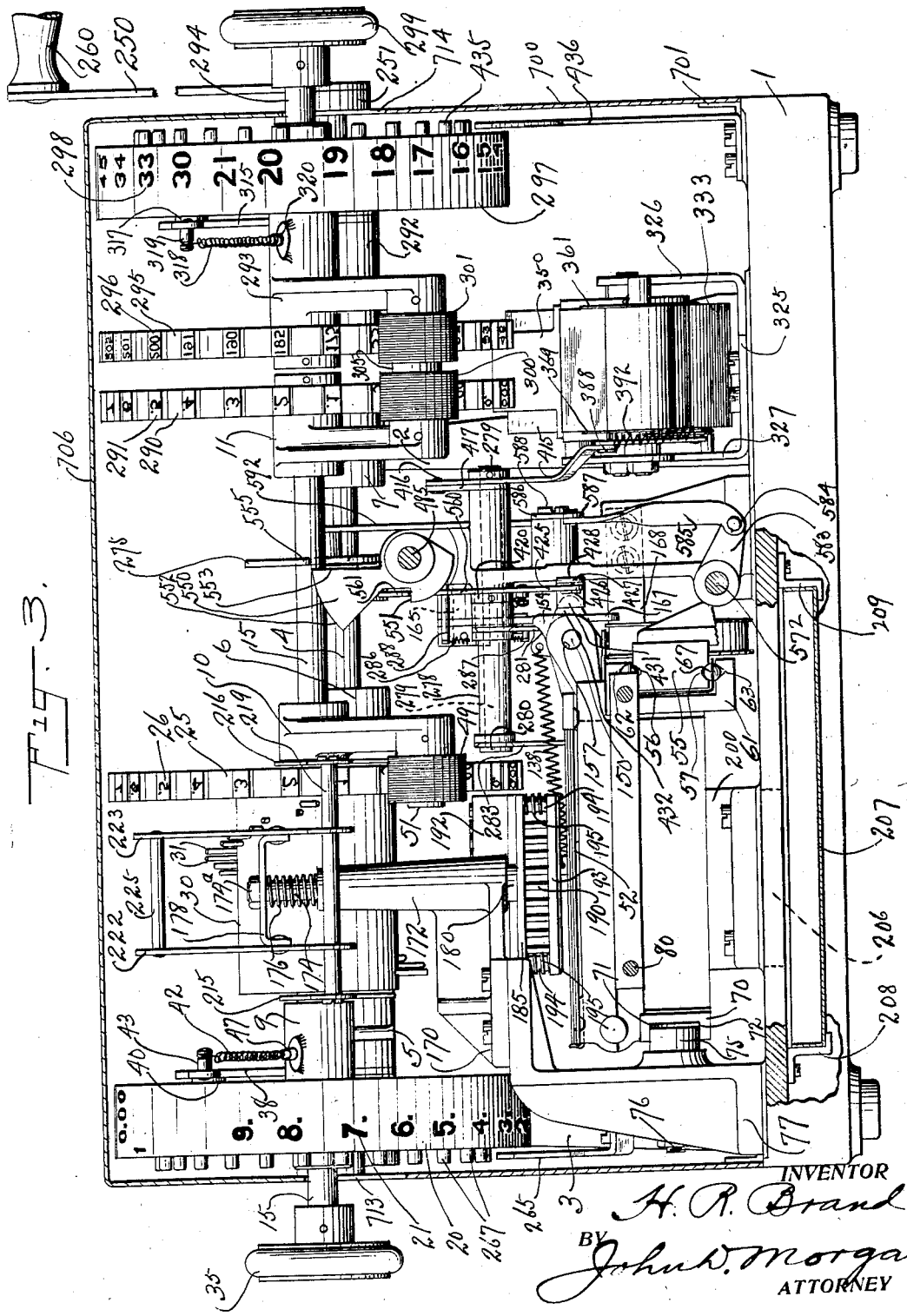
Fig. 3 is a front elevation on an enlarged scale of the machine partly in section and with certain parts omitted.

A spring 248, under tension, has one end attached to the arm 240, the other end being fastened to a lug on the bracket 243. The action of the spring 248 is such as will give the shaft 4 a parital rotation in a clock-wise direction as seen in Fig. 2, the screwhead 245 abutting the stud 242 to limit this rotation and maintain, when desired, a condition of rest for the shaft 4 and certain connected parts.

Limited rotation of the shaft 4 in a counter-clockwise direction, or such as will perform the printing and perforating functions, is obtained by means of an arm 250 (Figs. 1, 3 and 34) whose hub 251 is detachably fixed to the end of the shaft 4. A collar 252, fast to said shaft, has a tooth 253 adapted to engage an opposing slot 254 in the hub 251. A split-ring spring 255 operatively fits both in a groove 257 of the hub 251 and a groove 258 of the shaft 4, its function being to hold the tooth 253 and the slot 254 in driving engagement when desired, but to permit their disengagement and the removal of the arm 250 for a purpose hereinafter described.

A knob handle 260, suitably mounted on the free end of the arm 250 provides a convenient means for manually giving the desired rotation to the shaft 4.

The embodied form of the invention also provides means both for insuring the proper positioning of the printing means and for locking the shaft 15 in its selected angular position while performing the printing and perforating operations. As constructed, there is an upwardly projecting plate 265 (Figs. 3, 6 and 7) having the open-ended slot 266, and fixed to the bracket 77.

Operatively placed with respect to the slot 266 is a series of pins 267 (see also Figs. 1, 3, 6 and 7) fast in, and projecting outwardly from, the web of the flanged disk 20; each pin being suitably placed with respect to a type on the wheel 25, and adapted to enter the slot 266 and be guided and held thereby when the shaft 4 and its connected parts are rotated to carry the shaft 15 towards the punches 190.

The operation of the embodied mechanism so far described is as follows:

The carrier 60 is drawn outwardly to its extreme position and there latched and held by the engagement of the hooked arm 135ª and the stud 135ᵇ. The holder 52 with its suitably printed insert 53 is properly placed within and detachably held by the positioning stops on the carrier 60.

In order to print a particular price, the shaft 150 is partially rotated sufficiently to permit the hub 149 to be desirably moved axially thereon and the arm 151 of the hub 149 engaged between the appropriate teeth 125 on the carrier, opposite the name of the corresponding article of food.

By means of the hand wheel 35 the shaft 15 is rotated until the proper and desired type 26 is brought into printing position, and detachably held by the coaction of roller 40 and teeth 37, it being understood that a punch operating pin 31 is thereby selected to cause the proper corresponding punch to perforate the insert, simultaneously with the printing, in the predetermined position which corresponds, in value to the numeral printed and as shown at 126ᶜ and 126ᵇ, respectively, in Fig. 31. The push rod 141 is then operated, disengaging the arm 135ª from the stub 135ᵇ and the carrier 60, impelled by the spring 98, travels backwardly, preferably under control of the operator, until the face 148 contacts with the arm 167, and carries to the plate 168, at which point the carrier 60 is arrested and the shaft 4 permitted to be rotated as is further described.

The arm 250 is now operated to give partial rotation to the shaft 4 and through its connected mechanism, the shaft 15 is depressed to cause the impression of the selected type on the insert and to perforate the latter by the selected punch. The arm 240 is returned by the spring 248 and the shaft 4 is again ready to repeat its functioning.

Just prior to the described operation on the insert the registry of the print and perforations are insured by the coaction of a pin 267 and the appropriate positioning slot 266.

It may be necessary to select another type and punch to complete the full price and in such case, the shaft 15 is rotated in the proper direction to bring into the operative position the desired character, and the shaft 4 is again rotated for the impression on and perforation of the insert 53, the carrier 60 maintaining its proper position. On the completion of the desired printing and perforating operations, the carrier 60 is again pulled forward and the frame and insert removed.

Means are also provided to prevent the operation of the shaft 4 and the downward movement of the shaft 15 until the carrier 60 has approximately reached its predetermined position. This means comprises an upwardly extending lever 270 fast to the end of the rock shaft 165 opposite to that on which is fixed the arm 167 (Figs. 1, 4 and 28), the free end of this lever having a seat 271 and a prong 272.

Fast on the shaft 4 is an arm 275 with a lug 276, the latter operatively placed with respect to the seat 271 and the prong 272 so that with the arm 167 in the position shown in full lines corresponding to a position of the carrier 60 in its approach to the predetermined arrest, the seat 271 engages the lug 276 in a manner to prevent the rotation of shaft 4. Also the engagement of the prong 272 and the lug 276 suitably positions the arm 167 against the action of the spring 169.

Figure 4:
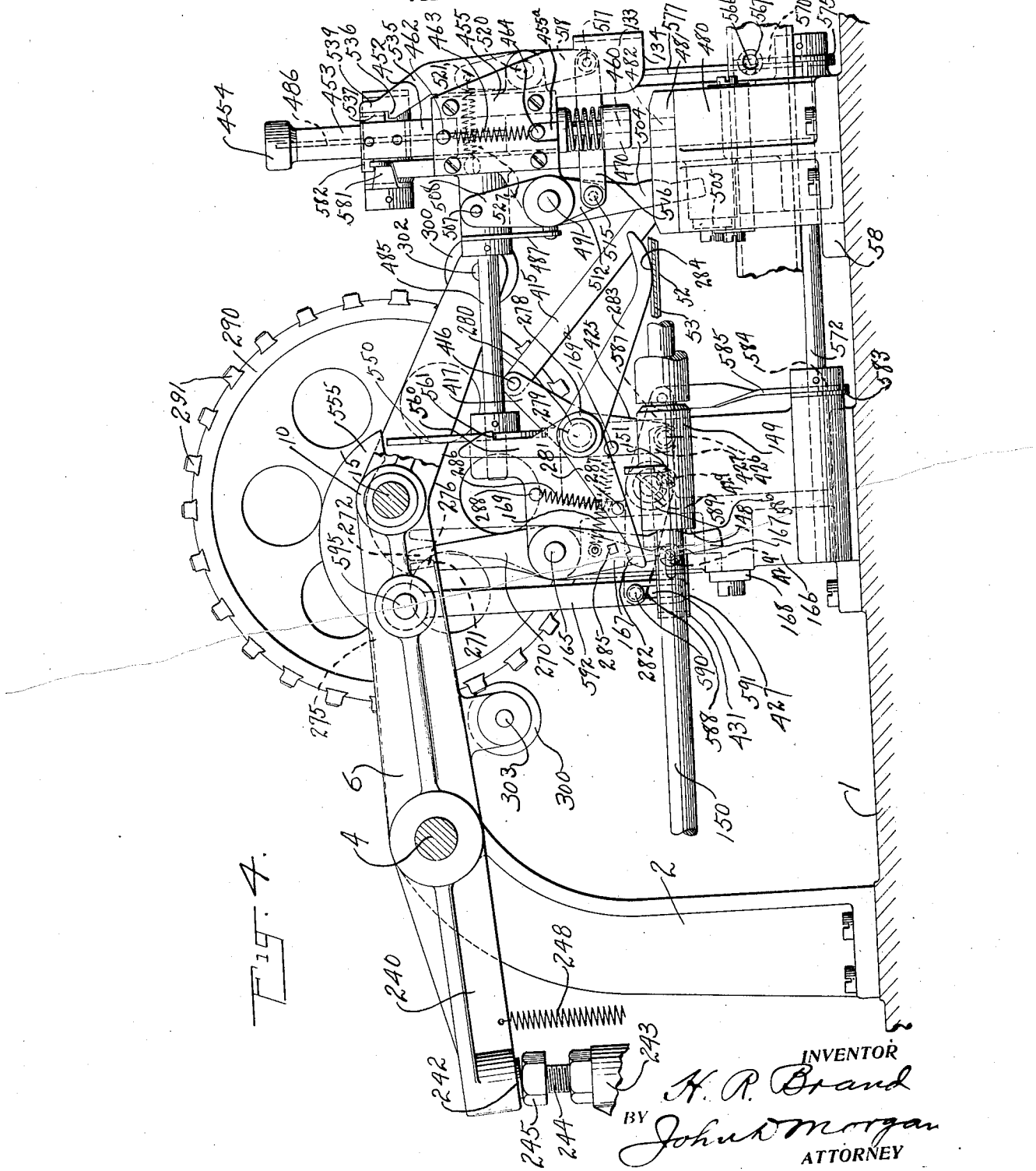
Fig. 4 is a section of the machine on an enlarged scale in elevation taken on the line 4—4 of Fig. 1 and looking from the left hand side thereof, and illustrating certain locking devices, other parts being omitted.

It will be evident from the foregoing that contact and backward movement by the hub-face 148 and the arm 167, and the consequent partial rotation of the shaft 165, will disengage the arms 275 and 270 and permit the actuation of the shaft 4, as clearly shown by the dot and dash outline of the parts in Fig. 4.

In connection with the locking of shaft 4 means are also provided by the present embodiment of the invention to guard against the printing and perforating operations unless an insert is present on the carrier 60. As shown, a sleeve 278 (Figs. 1, 3, 4 and 28) is rotatably mounted on a shaft 279, freely mounted in the bracket 166, and is fixed to move in its operative position by the head 280. Fixed to one end of the sleeve 278 is an arm 281 with a tooth 282. The opposed end has fast thereon a lever arm 283 with a suitably shaped portion 284 positioned with respect to the plane of the insert 53. A pin 285 is fixed on the arm 167 operatively adjacent to the tooth 282 and adapted to so coact therewith that an angular movement of the arm 167 backwardly is prevented if an insert 53 is not in place.

A spring 286, under tension has one end fastened at 287 in the arm 281, the other end being held by a pin 288 fast in the bracket 166.

It will be evident from the foregoing that with the frame 52 properly positioned on the carrier 60 and carrying an insert 53, the contact of the surface of the latter will rock upwardly the arm 283 and thus carry the tooth 282 out of the path of the pin 285, and that in the absence of the insert the tooth 282 will prevent the operation of the arm 167 by the hub 149. (Fig. 4 shows the former condition and Fig. 28 the latter.)

A feature provided by the invention is the recording on a strip within the machine of the price printed on the insert, together with the identity of the agent whose number appears at 119 on the frame 52. As embodied, (Figs. 1, 3, 5 and 21) there is fixed on the end of the shaft 15 opposite to that carrying the hand-wheel 35, and adjacent to the bearing 11, a type wheel 290 carrying the type 291 on its peripheral surface. The said wheel and type are substantially identical with the wheel 25 and the type 26, the type having the same angular disposition, like characters of each being in the same radial planes. Thus rotation of the shaft 15 will bring identical characters on each of the wheels to the same operating position.

Referring now to the means for recording the agents' identifying marks there is fast on the shaft 4 (Figs. 1, 3 and 5) an arm 292 with a bearing 293 in which is rotatably mounted a shaft 294, which is in alignment with, but detached from, the shaft 15. Adjacent to a face of the bearing 293 is a wheel 295, similar in construction to the wheel 25 and 290 and of substantially the same diameter. Type 296 are carried on the peripheral surface of the wheel 295, the characters corresponding to the identification numbers 119 on the frame 52, Fig. 31. It will be understood that the radial distance of the printing surface of all types on the wheels 25, 290 and 295 are preferably the same.

Also fixed to the shaft 294 (see Fig. 12) adjacent the face of the bearing 293 opposed to that against which the type wheel 295 operatively bears, is a disc 297 upon the peripheral surface of which are the same characters 298 as are carried by the type wheel 295 and of the same angular disposition. As is hereinafter described, the characters 298 are so placed as to be conveniently read by the operator and in accordance therewith arranged to bring into operative position the desired type.

The outer end of the shaft 294 has fixed to it a hand wheel 299, similar to the wheel 35, for rotating the shaft 294 manually in either direction.

Means are also provided for inking the type 291 and 296 and in the present embodiment of the invention (Figs. 1, 2, 3, 5 and 21) the rollers 300, and 301, preferably of such surface material as will retain and give off a printing fluid, are rotatably mounted on rods 302 and 303, the opposed ends of each of which are fixed in the arms 7 and 292. The rollers 300, 300 are suitably placed adjacent the arm 7 and their peripheral surfaces are in contact with the type 291. The rollers 301, 301 are suitably placed adjacent the arm 292 and their peripheral surfaces are in contact with the type 296. Collars 305 and 306 freely mounted respectively on the rods 302 and 303 aid to preserve the alignment of the rollers 300 and 301 with their respective type wheel.

It is evident from the foregoing, that rotation of the type wheels 290 and 295 will make contact between the type 291 and 296, and the respective sets of inked rollers 300, 300 and 301, 301 and suitably prepare the type for making impressions, as hereinafter described.

Means are also provided to detachably retain, in a desired position, the shaft 294 and its connected mechanism, the wheel 295 and the disc 297. Such mechanism includes a star wheel 312 (Figs. 9 and 12) similar to the wheel 36, fast on the shaft 294, which has the teeth 313 on its periphery indexed to correspond to the angular disposition of the type 296 on the wheel 295. An arm 315 (see also Figs. 1 and 3) is freely mounted on the shaft 4 and has fixed at its free end a stud 316 which rotatably carries a roller 317 operatively placed for cooperation with the teeth 313 similar to the action of the roller 40 and the wheel 36.

A spring 318, under tension, has one end fastened to the arm 315 at 319, the opposite end being attached to a pin 320 on the bearing 296, and is adapted to cause frictional engagement between the roller 317 and the teeth 313.

Referring now to the embodied form of the record receiving means (Figs. 2, 3, 5, 21, 22 and 23) there is fixed on the base 1 a bracket 325, of sheet metal construction with the bent up side portions 326 and 327.

At one end of the side 327 (see particularly Fig. 23) is fixed a stud 330 with the shoulder 329, and rotatably carrying a sleeve 331 frictionally supporting a core 332 of a tightly wound roll 333 of tape 333ª, preferably paper. The free end of the stud 330 has an open slot 335 in which is freely carried an arm 336 rotatably mounted on a pin 337 fast in the stud 330. A spring member 340 has one end fixed in the stud 330, the free end contacting, under tension, with the pivoted end 341 of the arm 336. The coaction of the spring 340 and the arm 336 detachably maintains pressure contact between a face 342 of the arm 336 and a washer 345 in contact with the sleeve 331. The shoulder 329 of the stud 330 positions the sleeve against the action of the spring 340, and operatively maintains the roll 333 in the desired relation with the wheels 290 and 295 so that the tape 333ª may receive the desired impressions, as is hereinafter described.

The roll 333 and the sleeve 331 may be removed for replacement by swinging the arm 336 to substantially a horizontal position, the latter being held by the action of the spring 336 on the edge 346, it being evident that the sleeve is adapted to be drawn over the device.

In frictional contact with the periphery of the roll 333 is a blade 350 (Figs. 2, 21 and 22) freely mounted on a stud 352 fixed in the side 327. A spring 353, under tension has one end fast in the stud 352 at 351, and the other end attached to the blade 350 and adapted to give the desired pressure at the free end of the blade, on the roll 333.

In the embodied form of means whereby the paper strip is fed from the roll 333 to present a new surface to the type wheels 290 and 295, a drum 360 (Figs. 21, 22 and 24) with the head 361 and web 362, is rotatably mounted on a stud 363 fast in the end of the side plate 327 of the bracket 325 opposite to that carrying the roll 333. A slot 364 longitudinally of the drum 360 is adapted to receive an end of the paper strip 333ª, the prongs 360ª, 360ª of the peripheral surface of the drum projecting therein and adapted to grip the free end of the strip 333ª from the roll 333.

A hub 365, with the web 366, has mounted thereon a ratchet wheel 368, with teeth 368ª and a plate 369, the parts being held together by the rivets 370. A shoulder 371 of the stud 363 and a hub 372 freely mounted on the latter serve suitably to position and freely retain the hub 365 and its connected parts in the desired operative position.

A suitably shaped pin 375 is fixed to the web 366, projects therefrom and slidably engages an opposed hole 376 in the web 362 of the drum 360, thus detachably locking the hub 365 to the drum 360; these parts, with the plate 369, form a spool.

The outer end of the stud 363 is slotted at 378 and 379; in these slots the free end of a spring member 380, having the other end fixed at 381 is adapted to move freely. A bent portion 382 of the spring 380 by pressure against the head 361 serves to maintain the engagement of the web 362 and the pin 375, but permits the drum 360 to be withdrawn and replaced at will, it being understood that spring 380 is under limited tension.

Formed as a part of the hub 372 (Figs. 21 and 22) are the arms 385 and 386 to which are respectively fixed the studs 387 and 388. A pawl 389, rotatably mounted on the stud 387, has an arm 390 and a tooth 391, the latter adapted to operatively engage the teeth 368ª of the ratchet wheel 368. A spring 392, under tension, has one end fastened to arm 390 and the other end attached at 393 to the arm 386, and adapted to hold the pawl 391 in engagement with the ratchet wheel 368.

A detent pawl 400, having the tooth 401 and the lug 402, is rotatably mounted on a stud 403 fixed in the side 327 of the bracket 325 in a position to engage the ratchet wheel 368.

A spring 405, under tension, has one end fastened to the lug 402, the other end being attached to a pin 406 in the side 327 of the bracket, holding the pawl in engagement with the ratchet 368.

Means are also provided to support the strip 333ª intermediate its supply and feeding ends and at a point substantially in the vertical plane including the shaft 294. This supporting means serves as an impression platen for the type wheels 290 and 295. As embodied (Figs. 5, 21 and 22), a shaft 410 is rotatably mounted in the bracket sides 326 and 327. A roller 411 is fixed on the shaft and has a peripheral surface 412 of a yielding material such as rubber. The strip 333ª is guided over the roller 411 and thus put into printing relation with the type wheels 290 and 295.

Referring now to Figs. 3, 4, 21, 22 and 28, the actuating means for imparting intermittent and partial rotation to the drum 360 for advancing the tape 333ª, consists of a link 415, one end of which is freely mounted on the stud 388, the other end being rotatably carried by a stud 416 fast in the free end of a lever 417 fixed on one end of the shaft 279. A hub 420 is also fixed to the shaft 279 and carries, as a part thereof, a depending arm 425, the free end of which is yoke-shaped and is operatively engaged by a stud 426 fast in the end of a slide 427 guided in the groove 428 in the bracket 166. Shouldered studs 429, 429 passing through the slots 430, 430 in the slide 427, serve to maintain the latter in its guide 428.

The slide 427 has a bent portion 431 (see Figs. 4, 28 and 30) at its end opposite to that carrying the stud 426, which extends towards the carrier 60, and is operatively placed in the path of an arm 432, see Figs. 1 and 13, fixed to the hub 160 on shaft 150. The pin 169ª to which is attached the spring 169 is fast on the arm 425, the spring 169 tending to return the feed pawl 389 after actuation, as is further described. During the latter part of the travel of the carrier 60 to its extreme outward position, the arm 432 will contact with the projection 431 and carry with it the slide 427 and through the connected mechanism drive the pawl 389 and give a rotary motion to the ratchet wheel 368, and drum 360 and thus draw from the roll 333 a desired amount of the strip 333ª.

A return of the carrier 60 backwardly will relieve the pressure of the arm 432 on the bent portion 431 and the pawl 389 will return to its position of rest, the spring 169 cooperating. The detent pawl 400 will maintain the drum 360 in its advanced position during the return movement of the feed pawl 389 and permit the ratchet wheel 368 to be rotated by this pawl, when desired.

The functioning of the shaft 4, when operated by the arm 250 will now be described in more detail. This operation causes the type 291 and 296, as set, to be brought into printing contact with the strip 333ª, thus printing a record, as already referred to. To insure registry and proper advance of the type 296 to the point of impression, a series of pins 435 (see Figs. 1, 2, 3, 9 and 12) are fixed to the web of the disc 297, protruding outwardly and corresponding in position and number to the type 296 in the wheel 295. Fixed to the base 1 is an upwardly extending plate 436 (see Figs. 2 and 9) with the guiding slot 437 operatively placed with reference to the pins 435, corresponding to the type 296 selected for impression and adapted to receive and position the pin 435 and thus suitably maintain the desired operative position of the type wheel 295 during impression.

Referring now to means, as provided by the invention, for making marks on the insert at a predetermined point, which marks do not correspond to the price, such for instance as a perforation, and which, for instance, may obliterate a previously printed price and nullify a previously punched price; an object being to use the perforation as a cancelation mark. This mark, shown at 120ᶜ Fig. 31, may be recognized in a totalizing machine, such as is embodied in my copending application for Letters Patent Serial Number 562,229 filed May 19, 1922, to operate means of a non-add character to prevent the inclusion, in the total, of the amount previously printed against the item canceled, as hereinbefore referred to.

As embodied (see Figs. 1, 4, 6, 25, 26, 27 and 29) the bracket 58 has a guideway 450 formed in its overhanging arm 451, and which is adapted to slidably carry a bar 452. Fixed at the upper end of the bar 452 is a piece 453, carrying on its free end a key 454 designated as the cancelation key marked with "C" in Figs. 1 and 34. A plate 455 is fastened to the arm 451 and serves as a cap to retain the bar 452 in its guideway 450.

The bar 452 has its lower end suitably shaped as a punch 460, operatively placed relative to the carrier 60; intermediate of its length it is provided with the shouldered portion 461. Fast in the plate 455 is a pin 462 carrying one end of a spring 463, under tension, the other end of which is fastened to a pin 464 fixed in the bar 452; the plate 455 is slotted at 455ª to accommodate the pin 464. The spring acts to keep the bar in an upward position limited by the abutting of the shoulder 461 against the opposed face of the arm 451.

Slidably mounted on the punch 460 is a stripper piece 470 which has fixed thereto a pin 471, adapted to cooperate with a slot 472 in the punch 460, to limit its movement under the action of a spring 473. The spring 473 is under compression, and embraces the punch 460 having its opposite ends abutting against the adjacent faces of the shouldered portion 461 and the piece 470.

A bracket 480, fast on the base 1 has fixed to it a die-block 481 with the die 482 suitably placed relative to the carrier 60 and in alignment with and adapted to receive the punch 460. The relation between the punch 460, the carrier 60, and the die block 481 is such that an insert 53 may be carried between the said punch and die block and be acted thereon by the depression of the key 454 to cause the punching of the insert in a desired position relative to the characters of the predetermined line of print. The stripper 470 tightly clamps the insert 53 against the die block 481, during the advance and return of the punch 460. Spring 463 returns the punch 460 to its free position upon the release of the key 454.

Beneath the die block 481, Fig. 26, and fixed on the bracket 480 is an open ended chute 483 adapted to give free passage to the blanks, from the die 482; the blanks fall through an opening 484 in the base 1, into the drawer 207, located below the opening 484.

In cooperation with the above-mentioned means of cancelation the invention provides means for arresting the carrier 60 with its insert at a desired predetermined position preferably different, in part, from the means hereinbefore described. As embodied there is suitably mounted in the brackets 58 and 166 a rock shaft 485 (Figs. 1, 3, 4, 25, 26, 27, 28 and 29), on one end of which is fixed an upwardly projecting lever 486.

Also mounted on the rock shaft 485, intermediate of its ends, is a depending arm 487 on the free end of which is fixed a pin 488 adapted to engage a groove 489 formed in a collar 490 on shaft 491. Shaft 491 is freely mounted in the bearings 495, 496 and 497 projecting from the bracket arm 451, and is adapted to rotate about its own longitudinal axis, and also to reciprocate in its bearings. To this shaft is fastened the collar 490 and the hubs 500 and 501.

A spring 486ª, under tension, has one end fixed at 486ᵇ on the lever 486, the other end fast at 486ᶜ on the bracket 58, and is adapted to maintain the lever 486 in the desired positions.

It will be evident from the foregoing that a movement of the lever 486 in a counter clock-wise direction (Fig. 27) will carry the shaft 491 to the right. A hub 502 is freely mounted on the shaft 491, but prevented from axial movement by the opposed faces of the bearings 495 and 496, the hub being positioned therebetween.

Fast to the hub 500 is a lever 503 with a downwardly projecting arm 504 suitably positioned so that the movement indicated above will carry the arm 504 to the position to intercept and be carried by the hub 149 (see Fig. 26) during the inward movement of the carrier 60. The movement of the lever 486 in the opposite direction a suitable distance, will carry the arm 504 out of the path of the hub 149, as shown in Fig. 27.

It is to be understood that the operation of the lever 486 to put lever 504 in a position to be engaged by the hub 149 can only be accomplished when the carrier 60 has been withdrawn to and held in its extreme outward position, as will appear from the subsequent description.

A plate 505 is fixed to the bracket 58 (Figs. 25, 26, and 29) and suitably positioned to act as a stop for the arm 504 when carried backwardly by the hub 149 and thus arrest the carrier 60 in the desired position.

Means are provided to prevent the actuation of the key 454 prior to the arrest of the carrier 60 by the arm 504 and its stop 505; this means comprises the lever 503 (Figs. 1, 4, 25, 26 and 29), having an upwardly projecting arm 506, which carries one end of a rod 507, the other end of which is held by an arm 508 fixed on the hub 501. Intermediate the arms 506 and 508 is an arm 510 of a lever 511 which is fixed to the hub 502. The free end of the arm 510 embraces the rod 507 in a manner to permit the rod 507 in consequence of a like movement of the shaft 491, but adapted to have like angular movement with the rotation of the latter on its axis.

An arm 512 of the lever 511 has fast thereto a stud 515 which latter freely carries one end of a link 516, the other end of which is pivoted on a stud 517, fixed in an arm 518 of a lever 519. Lever 519 is fixed on a rock shaft 520, rotatably mounted in the bearing 525 protruding from the bracket-arm 451. Arm 521 of lever 519 has fastened at its free end, one end of a spring 527, under tension, the other end of which is fastened at 529 in the bracket-arm 451.

Also fast on the shaft 520 is an upwardly projecting arm 535, which has formed on its free end the shoulder 536, which latter is adapted to engage a projection 537, extending outwardly from the bar 452; an extension 539 of the arm 535 positions the latter against the action of the spring 527.

It is evident from the foregoing, that until the shaft 491 is rocked, the cooperative engagement of the tooth 536 and the projection 537 will prevent the depression of the key 454.

Means are also provided for preventing the placement of the arm 504 in the path of the hub 149 at times other than when the carrier 60 is in its extreme outward position, as briefly hereinbefore referred to. Further cooperating means also prevent the operation of the cancellation key, when the pricing function is being performed. As embodied, there is fast on the rock-shaft 485 (Figs. 1, 3, 4, 28 and 29) a vaned piece 550 shaped with a seat 551, the segment surface 552 and the radial edge 553. The vane 550 is suitably placed for cooperation with an extended portion 555 of the arm 275 and also with a latch 560 fast on the shaft 279.

A tooth 561, formed on the free end of the latch 560, is adapted to engage the seat 551, and the surface 552 is arranged to engage with the portion 555 of the arm 275.

The parts just described operate as follows:

The shaft 485 and handle 486 must be turned clockwise, looking from the front of the machine, for putting the lever 504 in the path of the hub 149. As shown in Fig. 4, the latch 560 prevents such clockwise movement. However, when the carrier 60 is pulled all the way out, the slide 427, Fig. 28, is moved, which moves the shaft 279 and the latch releases the vane 550. Now shaft 485 and handle 486 are turned clockwise to put the lever 504 in the path of the hub 149 for stopping the carrier at its appropriate point for the cancellation operation. This same movement moves the vane 550 under the arm 275 for preventing the printing operation during the cancellation operation.

The attempted performance of the cancelation operation during the printing operation is prevented by the spring 527, Fig. 29, holding the locking bar 535 in a locking position, which prevents the depression of the key 454, the projection 537 cooperating.

Briefly to summarize the cancelling operation: The carrier 60 is pulled all the way out; the hub 149 is then set opposite the price it is desired to cancel, by engaging its arm 105 in the tooth rack. Shaft 485 having been unlocked by the engagement of carrier 60 and the connection 427, is free to be rotated and handle 484, on this shaft is swung to the left, as shown in Fig. 26. This throws lever 504 in the path of the hub 149 and their engagement unlocks the canceling mechanism. Depression of the key 454 completes the canceling operation. The carrier 60 is meanwhile locked as is hereinafter described.

Means are also provided to lock the carrier 60 during operations on the insert for the perforation of the cancelation holes and also for printing and perforating the item prices. In the present preferred embodiment of the invention the guideway 55 has slidably mounted therein at 565 (Figs. 25 and 26) a plunger 566, adapted to engage, when desired, any one of a series of holes 567 (see also Fig. 15) in the channel 61 of the carrier 60, which holes 567 are positioned in a definite relationship with the teeth 125.

At the outward end of the plunger 566 there is formed the clevis head 568, which has fixed thereto a pin 569 on which is freely carried the end of the arm 570 of the bellcrank 571, which is fast on a rock-shaft 572 rotatably mounted in a bearing in the brackets 58 and 166, Figs. 28 and 29.

Referring now to the punching of the cancelation perforation there is an arm 575 of the bell crank 571, which has freely attached to it at 576, one end of a link 577, the other end of which is pivotally carried by a stud 578, fixed in an arm 579 fast on the shaft 580, which is rotatably mounted in the bracket arm 451 (see also Figs. 26, 27 and 29). An arm 581 is also fast on the shaft 580 and its free end is adapted to be engaged, on depression of the key 454, by a lug 582 of the bar 452.

A spring 579ª, under tension, has one end fast to the lever 579 and the other end fixed on a pin 579ᵇ fast in the bracket arm 451.

The foregoing clearly shows that the operation of the key 454, will, through co-operating and connected mechanism, drive the plunger 566 in one of the aligned holes 567 and lock the carrier 60 during the perforation of the cancelation holes.

Referring now to the locking of the carrier 60 during the printing and perforation operation, there is (Figs. 1, 3 and 4) fixed on the rock-shaft 572, adjacent to a bearing face of the bracket 166, an arm 583, the free end of which is pivotally connected at 584 to one end of a link 585. Link 585 is connected to the arm 587 of a lever 586, pivoted on the stud 589. The other arm 588 of the lever has fixed in its free end a stud 590, which operatively engages the slot 591 of a link 592, which latter is freely mounted, at its end opposite to the slot, on a bracing rod 595 having its ends fast in the arms 6 and 7.

It will be evident that the operative movement of the shaft 4 will carry the link 592 downwardly and through the mechanism just described, drive the plunger 566 in the positioning holes 567. Also it will be noted that the slot 591 permits the free action of the other parts connected with the shaft 572 during the depression of the cancelation key 454.

Means are provided in the embodied form of the invention to make the machine, in certain of its features, inaccessible and as illustrated a case 700 (Figs. 1, 2, 3 and 34) is fastened to the base 1 by braces 701, 701 attached to the casing 700. A suitable opening at 702, in the front of the casing 700 permits the withdrawal of the carrier 60, when it is desired to place thereon or remove therefrom the holder 52 and its insert 53, or for any other reason or operation. The plate 703, fast on the carrier, closes the opening 702 when the carrier is in its extreme inner position.

The carrier-release-rod head 146 is shown slidably protruding from the front of the casing 700 and is accessible to the operator.

Hinged at 705 is a cover 706 provided with a lock at 710 of any suitable type. The handle 250 is shown extending outwardly from the cover 706, as are also the shafts 15 and 294, their respective hand-wheels 35 and 299 being conveniently placed for operation. The cover 706 is provided with suitable clearance apertures 711 and 712, which permit the free passage, when the cover is lifted, of the perforating key 454 and lever 486, respectively. The cover is also provided with the respective slots 713 and 714 for shafts 15 and 294. The handle 250 is detached and removed from the machine when the cover is removed, the hub extending through a clearance aperture in the cover 706. Openings 715 and 716 are provided in the cover 706 suitably placed relative to the discs 20 and 297, respectively, and through which the characters are visible; such characters indicate the type which are in printing position, respectively, on the wheels 25, 290 and 295.

The drawer 207 is also shown as adapted to be withdrawn without disturbance of the casing 700.

In Figs. 35, 36 and 37 is shown a modified form of the mechanism carried by the shaft 294 and by which the available numbers, identifying the agent, are increased to meet all probable needs, but it is evident by increasing the discs and type wheels, the combinations may be practically limitless.

A shaft 750, rotatably mounted in a bearing 751, (a modified form of the arm 292) and, as was the shaft 294, in alignment with the shaft 15, has fast thereto a type wheel 752, with the type 753 on its periphery, angularly spaced, for convenience, as are the type 291 on the wheel 290. The wheel 752 is of the same peripheral diameter as wheel 290. A disc 755 is also fast on the shaft 750 and carries on the peripheral surface numbers 756 of the same angular disposition as the type 753 a corresponding character for each of the type, but arranged to be read through the opening 716, for the printing position of the like type 753. A hand wheel 757 is fixed on the end of the shaft 750. Freely mounted on the shaft 750, between the wheel 752 and the opposed face of the bearing 751 is a type wheel 760, with the type 761, the arrangement being similar to the wheel 752 and its type 753.

Between the disk 755 and the hand wheel 757 is a sleeve 765 freely mounted on the shaft 750 and carrying fixed on one end a disk 766 and fixed on its opposite end a hand wheel 767. The peripheral surface of the disk 766 carries characters 768, corresponding to the type 761 and arranged in relative relation thereto, as are the characters 756 and the type 753, for reading through the opening 716 of the case top 706.

A shaft 770, rotatably mounted in a bearing 771, carried by the arm 295, modified as shown, has fast on its opposite ends the pinions 772 and 773 in driving relations with the respective gears 774 and 775, the former fast to the disk 766 and the last fast to the type wheel 760, and of such proportions that an angular movement of the disk 766 will give an equal movement to the wheel 760.

It will be evident that rotation of the hand wheel 757 will give like movement to the disk 755 and the wheel 752 and that rotation of the hand wheel 767 will give like movement to the disk 766 on the type wheel 760 and that each of these connected mechanisms may be independently operated. The type 753 and 761 are in operative contact with the inking rollers 780, 780, and 781, 781, freely mounted on the rods 302, 303. Washers 782 and 783 are between the pairs of rollers 780, 781 and 780, 781.

Means are provided, as in the case of the disk 297, to detachably maintain the disks 755 and 766 in a desired position during the printing operation and as embodied, the pins 790, 790 are fixed to the side of the disk 755 as are the pins 791, 791 to the side of the disk 766 and are angularly disposed as are the type 753 and 761 respectively.

The star-wheels 792 and 793 are respectively fixed to the sides of the disks 755 and 766 and respectively have formed in their peripheries the teeth 794 and 795 indexed to conform to the disposition of the type 753 and 761.

The arms 800 and 801 are loosely mounted on the shaft 4, the first carrying a stud 802 fast on its free end, and the second a stud 803. The rollers 805 and 806 are rotatably carried, respectively, by the studs 802 and 803 and are suitably positioned for operative contact with the teeth 794 and 795, respectively.

A spring 810, under tension, has one end fastened to the arm 800, and the opposed end held by an eye-screw 811 fixed to the base 1. Similarly a spring 812, under tension, is fastened to the arm 801 and to an eye-screw 813 also fixed to the base 1.

The action of the means thus described is identical to that shown in relation to the disk 297.

A plate 815, preferably of bent sheet metal, is fixed on the base 1 and has the upwardly extending arms 816 and 817, the former having a suitably shaped and positioned slot 818 for cooperation with the pins 790, and the latter a similarly shaped slot 819 for cooperation with the pins 791.

As has been heretofore described in connection with the pins 435 and slot 437, the operation of the shaft 4 will cause the pins 790 and 791 to operatively engage, respectively, the slots 818 and 819.

*Statement of procedure.*

The equipment, operation of mechanism, and the business transactions and control, as applied to the restaurant business, by way of example, will now be described, and by obvious analogy its acts and features in connection with articles other than the standard or ordinary in any commodity purveying or handling business will be readily understood therefrom.

A controller, which may be generally similar to that of my application Ser. No. 527,516, is marked "Special order" which prints on the guest check the name "Special order" without price or perforations therefor. That is, the linotype slug, corresponding to the slug 323 in said application Ser. No. 527,516 prints the words "Special order" instead of the name and price of a commodity. Also all the punches 221 of said controller are left in the ungagged or inoperative position, or may be removed. This controller performs all other functions, including the ejection of the token and performing the annunciation.

An annunciator is located, not at the kitchen, but at the special order station, the charge being made against the latter. A token receiver is also located at the said station, the operation of which credits on the special order annunciator similarly to the kitchen annunciator.

A "special order" machine of the present invention is provided for printing opposite the name "Special order" (which name was printed on the check by the controller) the determined price and for perforating the price representation in the guest check. This machine also prints the waiter's number and the commodity price on a strip within the machine. This machine also is located at the special order station.

*Records and forms made and issued by the special order station.*

An order register (see Fig. 38) is provided for recording the data relative to the special order which has already been described. An order-on-chef slip in duplicate (see Fig. 39) is provided, the original of which is given to the waiter at the special order station in exchange for the special order token. This constitutes the waiter's demand on the chef for the commodity. On delivery, the chef retains the order as a receipt for the commodity issued. The duplicate is retained at the special order station, as is hereinafter described.

*Procedure.*

The waiter operates the special order controller previously referred to, and receives a commodity demanding token with the special order designations thereupon. He then presents this token to the special order station together with the check on which the name "Special order" has been printed by the controller. The special order station makes the entries in the order register, giving date, waiter's number, the name of commodity and the price, substantially as shown in Fig. 38.

The "special order" machine of this invention is then set to print and perforate the price in the desired relative positions to the said printed name on the check holder. The waiter's number is also set in the machine, the check holder and its insert placed in the machine, and the machine operated. This operation completes the entry on the check and also charges the waiter on a strip within the machine with the price of the special dish.

The special order slip on the chef is then filled out by the steward and carries a serial number and date of issue, the order register number, the waiter's number and the name of the special dish, the slip being signed by the employee in charge of the special order station. The original of this is given to the waiter, who in turn presents it to the chef as an order, and in exchange, for the prepared dish. The duplicate of this slip is retained by the special order station, and the original by the chef. These slips are inaccessibly deposited by them, respectively, in two different receptacles, which are operable only by some supervisory authority. The consecutive numbering on the slips, as well as the check up by the register, will insure the deposition, or the detection of non-deposition, of the slips.

*Statement of machine operation.*

The manner of operation of the hereinbefore described mechanism in carrying out the transaction is substantially as follows:

PRICING.

*Positioning the guest's check.*

The carrier 60 is drawn outwardly from casing 700, against the tension of spring 98, until the hook of arm 135$^a$ engages stud 135$^b$, the coaction of which detachably maintains the carrier in its exposed receiving position. Frame 52 with its insert 53, the guest check, is then placed face upward, on the carrier with its edges in engagement with stops 129, 130, 131 and 132 and with the end 115 adjacent to the outward end of carrier 60.

Frame 52 is pressed downwardly until the underside thereof is supported by the opposed side of the carrier; the ribs 116 and 117 of the frame entering the respective aligned grooves 60$^a$ and 60$^b$ of the carrier. Fig. 13 shows frame 52 in this position and the insert shows as the first item "Special order" and the one for which the machine is to be set for printing and perforating the desired price.

*Setting the carrier positioning stop.*

The hub 149 is moved axially on shaft 150 until arm 151 is substantially opposite the item to be priced and this arm is thrust into space 126 of ledge 124, and is held firmly in engagement therewith by the adjacent teeth 125 and the spring 138.

It will be understood that there is a space 126, preferably opposite each of the line items on the supported check when the latter is properly placed and held on the carrier.

*Setting the printing and perforating mechanism.*

Assuming that the price to be printed opposite the "special order" item on the check is .35, and that the perforations corresponding to this amount are to be relatively placed with respect thereto in the check, as shown in Fig. 31, flanged disk 20 is rotated by means of hand-wheel 35 until the figure .3 appears at opening 715 of cover 706. This movement will position wheel 25 with type 26 for printing this part of the price in the desired position on the check, and will also position the proper pin 31 for coacting with a punch 190 to perforate a hole representing the figure .3.

The type wheel 290 is also set simultaneously with wheel 26 to bring a type 291 in printing position for impressing on tape 333$^a$ the characters .3. The movement of carrier 60 outwardly to its extreme position gives this tape a forward movement to position the charges in column alignment.

Assuming, for example, that the waiter who has negotiated the order is numbered 40, which identifying number is at 119 on the frame 52, disk 297 is rotated by means of hand-wheel 299 until the character 40 appears at opening 716 in cover 706. This positions type-wheel 295 so that type 296 is in printing position for impressing the character 40 on tape 333ª adjacent to the figure 3.

Type wheels 25 and 290 are maintained in this position by means of the coaction of star-wheel teeth 37 and roller 40, and wheel 295 is likewise maintained in position by a similar action between star wheel teeth 313 and roller 317.

It will be understood that types 26, 291 and 296 have been suitably inked by the sufficient advance and retrograde rotation of their respective type wheels.

*Positioning the carrier and the supported guest's check in operative position.*

Push rod 141 is now moved backwardly by manual pressure on head 146, and the carrier is thereby released from stud 135ᵇ. The operator, holding the carrier by handle 80, permits its return travel, under the impulse of tension spring 98, which movement continues until face 148 of hub 149 engages with arm 167, and carries the latter to plate 168. This plate acts as the stop to position the carrier and the supported check in the predetermined position for printing and perforating the characters and holes, respectively, in the desired relative position to the item " Special order."

The partial rotation of arm 167, as given by the retrograde movement of the carrier, carries seat 271 out of the path of lug 276 on arm 275, and thus permits the operation of shaft 4 and its carried mechanism.

*The printing and perforating action.*

Manually depressing arm 250 gives shaft 4 a rotative movement and thus the positioned type 26 is impressed on the guest's check and types 291 and 296 print on tape 333ª, and the predetermined perforation is made on the guest check.

The guest check now carries the item special order .3 and in order to complete the printing of the price of .35, disk 20 is again rotated until the characted .5 is visible through opening 715. The movement of shaft 4 is repeated and the character .5 is impressed adjacently aligned with that previously printed on both the check and the tape, and a suitably positioned perforation is made in the check, completing the representation for the price.

In both of these movements of shaft 4, types 26 and 291 are positively held in printing position by the cooperation of pin 267 and slot 266, and the type 296 is likewise positively held by a similar action between pin 435 and slot 437. Also the carrier is rigidly held in the arrested position by the entrance of pin 566 in an aligned hold 567 in the carrier. Rock shaft 572 and the mechanism connecting the same with rod 595 cooperating to that end.

The operations thus performed have printed the check with the desired charge of .35 against the guest, perforated the check with representations of this price for recognition by a totalizing mechanism, and the waiter has been charged on the inaccessible tape with this price printed adjacent to his identifying number 40.

The carrier may now be drawn outwardly and either the frame and its insert removed, or a setting made for a new position of the frame relatively to the printing position for pricing a subsequent item.

It will be understood that after each complete pricing, type wheels 25, 290 and 295 are preferably brought to an initial position with a blank space offered to the impression point and the carrier, after the removal of the frame, the said carrier is allowed to be returned to its position of rest within the machine casing.

*Cancelation.*

As above described, the carrier is outwardly drawn to its extreme position, and the frame and its insert suitably positioned thereon. Hub 149 is axially moved as before, and arm 151 set in the tooth space 126 opposite the item to be canceled, this latter being shown in Fig. 31 as the fifth item on the check.

Lever 486 is shifted to the right, resting in the position " C," Fig. 34, arm 504 being moved thereby into the path of hub 149. Shoulder 536 is thus carried out of the path of projection 537 of bar 452, and at the same time vane 550 is positioned to prevent the operation of the shaft 4, by acting as an intercepter for the arm 275.

The carrier is then released and permitted to travel rearwardly, hub 149 engaging with lever 504, and carrying the latter until it is arrested by stop 505. The carrier is then in position for performing on the check the canceling operation at the desired predetermined position.

Key 454 is depressed, and punch 460 is carried through the check preferably obliterating or cutting out the price of the item. During this operation, pin 566 is carried into its aligned hole, thus registering and positively maintaining the carrier and the supported check in the proper position.

The release of key 454 withdraws punch 460 and pin 566, and the carrier is free to be moved outwardly for the removal of the check. Lever 486 is thrown to the left, vane 550 being rotated so as to leave arm 555 and shaft 4 free to be operated when desired.

The return of the carrier to its initial position within the casing restores the machine to its normal condition or position.

*Statement of the special order transaction.*

The guest, for example, has ordered a special dish say "chopped chicken and ham omelet with onions." The waiter inserts the frame containing the guest check in the controller labeled "Special orders" and the check has printed thereon the item "Special order" without any price, as shown in Fig. 13. An identifying, or commodity-demanding, token is ejected by the machine and one order for a special commodity is registered on the annunciator at, and charged to, the special order machine station. Also the waiter is charged in the controller during the operation just described.

The waiter transmits, preferably verbally, the order to the operator at this station and in exchange for the special order token receives the original of the special order slip with the desired data thereon, Fig. 39, after the entry is made in the order register, Fig. 38, and the duplicate of the order slip is dropped in a container as a credit to the waiter for his surrendered token, the slips being inaccessible excepting to those authorized to collect them. The token is placed in the device cooperating with the annunciator at this station as hereinbefore referred to, and this operation cancels the order which has been charged to the station referred to and thereby credits the station for the issuance of the detailed special order.

The special order machine is set both for the determined price and the waiter's number, and operated to print on the check the price and to perforate thereon representations of the same, and also records against this waiter, on the inaccessible tape, the price of the commodity.

The waiter next verbally orders the commodity from the chef, and, upon the delivery of the dish, the slip which is the order on the chef is exchanged therefor, and is deposited by the chef in a container, as his receipt for the delivery of the commodity. As in the case of the slip deposited at the special order station this original slip is accessible only to the collector.

*Statement of the canceling transaction.*

Hereinbefore two cases are cited which require cancellation when the order given by the guest is correctly interpreted and so recorded.

In the first case, it is assumed that the commodity which has been ordered and so marked on the guest's check is "Potatoes au gratin" (Fig. 13). It will be understood that the controller representing this item has, when operated by the waiter, in addition to marking the check used, charged the chef's station with one order therefor, and has uttered to the waiter an identifying token to be used in exchange for the commodity it represents. Also the waiter has been charged with the commodity on an inaccessible record.

The guest, in the first example, revokes the order prior to the delivery of the commodity by the chef to the waiter. The waiter advises the special order machine station of the cancellation, and presents thereto the guests's check and the token identifying this order. The data relative to the cancellation is entered on the desired cancellation slips and include the waiter's number, the name or number of the commodity, the date and the reasons for rejection, (see Fig. 40). The cancellation order is filled out in duplicate, entered on the stub and the original copy given to the waiter, the duplicate of which is deposited in a container at the special order station, which is both a record of a charge against this station and a credit to the account of the waiter. As in the case of slips hereinbefore referred to the slip is accessible only to the authorized collector.

The desired setting is made on the special order machine, and when operated with the check suitably inserted therein, will perforate the check with the cancellation mark, desirably placed relative to the item on the check which has been canceled, see Fig. 31.

The token is subsequently deposited in the receiver, which coacts with the annunciator on which is charged, to the chef, one order for "Potatoes au gratin," to deduct the said order thus crediting the chef. The duplicate cancellation order slip is used to balance the material stock account of the chef, it being obvious that a stock adjustment is necessary as a token has been received and no delivery of material made.

In the second case, assuming the check carries the same item "Potatoes au gratin," and the guest declines to accept the dish upon delivery to him by the waiter:

The waiter has been charged with the order, the cook has been also charged, but has delivered the ordered commodity upon the receipt of the identifying token, which served to cancel the charge against the cook, and thus credit him with the delivery of the commodity.

In this instance, the waiter advises the proper person in authority in the dining room of the reasons for rejection and entries are made on the cancellation order slip (Fig. 41) in duplicate, and on the stub therefor. Both copies of these slips are given to the waiter, who in turn presents the guest check and the duplicate slip to the special order machine station, which slip is deposited in a container at this station as the waiter's credit for the cancellation. As in the cases of the slips previously referred to, the deposited slips are accessible only to an authorized collector. The special order machine is set and operated with the check properly positioned therein, and the check perforated with the cancellation mark properly positioned relative to the item affected in the manner already set forth in the description of the operation of the mechanism. The material is returned to the kitchen, and the duplicate cancelation order slips held by the special order machine station is used to balance the material stock record as before.

In the more general application of the invention, any selling or dispensing station, or agency will correspond to the waiter, as described in the particular exemplification of the invention as applied to a restaurant, and any supply or commodity and issuing station will correspond to the chef in said particular exemplification.

The invention in its broader aspects is not limited to the specific mechanisms shown and described but departures may be made therefrom within the scope of the accompanying claims without departing from the principles of the invention and without sacrificing its chief advantages.

What I claim is:—

1. In a recording mechanism including means for presenting in a desired relation a transaction record having a perforation thereon relating to a transaction which perforation is recognizable by another machine, means for perforating said record so that said first mentioned perforation will not be recognized by said other machine.

2. In a recording mechanism comprising a holder carrying an insert sheet with a printed item thereon and a price imprinting means for imprinting said insert, a price marking means for marking said insert for recognition by a computing machine, mechanism settable by an operator for selectively positioning the holder relative to the imprinting and marking means, and means for preventing operation of said imprinting and said marking means until the holder is in a desired predetermined position.

In testimony whereof, I have signed my name to this specification.

HARRY RUSSELL BRAND.